(12) United States Patent  (10) Patent No.: US 12,511,405 B2
Lokesh et al.  (45) Date of Patent: Dec. 30, 2025

(54) METHOD AND SYSTEM FOR FORTIFYING USER SECURITY

(71) Applicant: Dell Products L.P., Round Rock, TX (US)

(72) Inventors: Akash Lokesh, Bangalore (IN); Karthik Venkatesh, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 50 days.

(21) Appl. No.: 18/672,243

(22) Filed: May 23, 2024

(65) Prior Publication Data

US 2025/0363224 A1 Nov. 27, 2025

(51) Int. Cl.
*G06F 21/60* (2013.01)
*G06V 20/52* (2022.01)
*H04L 12/18* (2006.01)

(52) U.S. Cl.
CPC .............. *G06F 21/60* (2013.01); *G06V 20/52* (2022.01); *H04L 12/1827* (2013.01); *G06F 2221/2125* (2013.01)

(58) Field of Classification Search
None
See application file for complete search history.

(56) References Cited

U.S. PATENT DOCUMENTS

| | | | | |
|---|---|---|---|---|
| 8,181,036 B1 * | 5/2012 | Nachenberg | ........ | H04L 63/1416 709/224 |
| 8,867,780 B2 * | 10/2014 | Hodge | .................. | G06F 21/84 382/100 |
| 9,117,066 B2 * | 8/2015 | Nathan | ................... | G06F 21/32 |
| 9,390,282 B2 * | 7/2016 | Liden | .................. | G06F 21/6209 |
| 9,699,271 B2 * | 7/2017 | Brander | .............. | G06F 21/6245 |
| 10,347,293 B1 * | 7/2019 | Skinner | ................ | G06F 3/1462 |
| 10,528,838 B1 * | 1/2020 | Carter, Jr. | ........... | G06Q 20/042 |
| 10,715,762 B2 * | 7/2020 | Lee | ..................... | G06F 3/04817 |
| 10,846,573 B2 * | 11/2020 | Skinner | ................... | G06F 21/62 |
| 11,250,169 B2 * | 2/2022 | Young | .................... | H04L 9/088 |
| 11,308,236 B2 * | 4/2022 | Childress | ................ | G06F 21/84 |
| 11,450,104 B1 * | 9/2022 | Mittal | .................... | G06V 40/10 |
| 11,468,256 B2 * | 10/2022 | Heyman-Dewitte | ...................... | G06K 7/1443 |
| 11,544,415 B2 * | 1/2023 | Singh | ...................... | G06F 21/84 |
| 12,013,965 B2 * | 6/2024 | Anasta | .................... | G06F 9/451 |
| 2017/0098098 A1 * | 4/2017 | Xiao | .................... | G07F 7/1025 |

(Continued)

*Primary Examiner* — Backhean Tiv
(74) *Attorney, Agent, or Firm* — Chamberlain, Hrdlicka, White, Williams & Aughtry; Aly Z. Dossa

(57) ABSTRACT

A method for managing security of a user includes: establishing a connection with a visual sensor; capturing a snapshot of an environment, in which the snapshot is a viewable area of the environment that can be imaged by the visual sensor; making a first determination that an image of a sensitive object (SO) is detected in the environment; protecting the SO by blurring or masking the image; making a second determination that the user joins a call; monitoring, based on the second determination, the environment to capture a video feed; making, based on the feed, a third determination that a sensitive action is detected; protecting, based on the third determination, a second SO (SSO) resulting from the sensitive action by blurring or masking a second image of the SSO; and making a fourth determination that the user requests removal of the blurring or the masking of the second image.

20 Claims, 11 Drawing Sheets

(56) References Cited

U.S. PATENT DOCUMENTS

| | | | |
|---|---|---|---|
| 2021/0182440 A1* | 6/2021 | Singh | G06F 21/6245 |
| 2021/0365589 A1* | 11/2021 | Qiao | G06F 21/84 |
| 2022/0253541 A1* | 8/2022 | Sloane | G06F 16/258 |
| 2023/0214481 A1* | 7/2023 | Singh | G06F 21/44 |
| | | | 726/26 |
| 2023/0409747 A1* | 12/2023 | Pierce | G06F 21/14 |
| 2025/0139288 A1* | 5/2025 | Kulkarni | G06F 21/604 |
| 2025/0165650 A1* | 5/2025 | Rahimov | G06F 21/6254 |
| 2025/0240323 A1* | 7/2025 | Meisel | H04L 63/1483 |

* cited by examiner

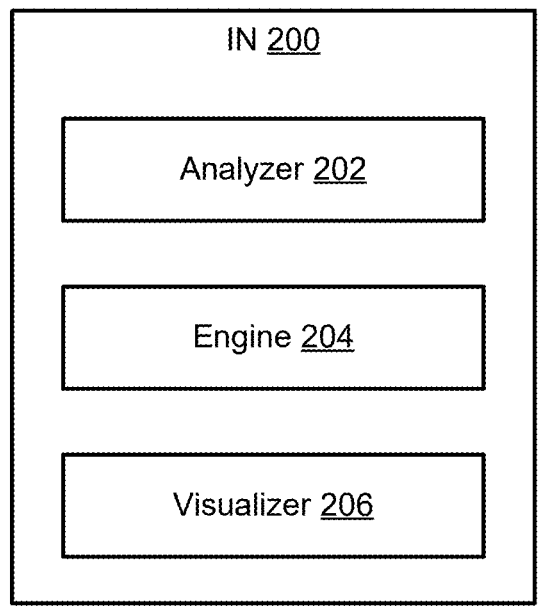
FIG. 2.1
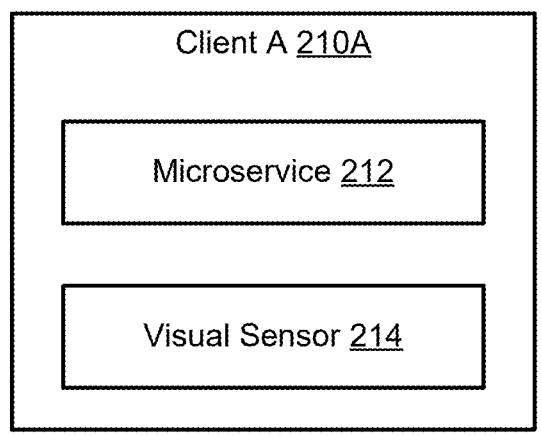
FIG. 2.2

*Example pseudocode for a microservice to establish a connection with a camera of a client*

```
#import necessary libraries
Import camera_library initialize the integrated camera connection
camera = camera_library.initialize_integrated_camera()

#define parameters for the camera
camera.set_resolution (1920, 1080) #set the resolution for the camera
camera.set_frame_rate(30) #set the frame rate for the camera check if the camera connection is successful
if camera.is_connected():
  print("Integrated camera connection is successful.")

#capture a photo
photo = camera.capture_photo()
#save the photo (or process it as needed)

#record a video
video = camera.record_video(duration = 10) #recording a 10-second video
#save the video (or process it as needed)

#release the camera connection when the video conferencing is finished
camera.release()
```

FIG. 4.1

*Example pseudocode to identify whether or not one or more video conferencing applications are executing on the client*

```
#list of video conferencing apps. and other apps. to check
apps_to_check = ["A1.exe", "A2.exe", "B4.exe"]

#initiate the microservice
microservice_command = "ABC microservice.py"

#check if any of the specified apps. are executing
for app in apps_to_check:
 if is_process_executing(app):
  #start the microservice
  microservice_process = subprocess.Popen(microservice_command, shell = True)
  show_alert(f"{app} is executing on your system. Microservice is started.")

#continuously check if the app. is still executing
  while is_process_executing(app):
   time.sleep(1) #sleep for 1-second
  else:
   #if the app. has stopped, stop the microservice
   microservice_process.terminate()
   #show_alert(f"{app} has stopped. Microservice is terminated.")
```

FIG. 4.2

*Example pseudocode for real-time object identification in a video conference/call*

```
#import necessary libraries
import video_processing_library
import object_detection_model initialize the video stream
video_stream = initialize_video_stream()

#load the pre-trained object detection model
model = load_object_detection_model()

#loop for processing each frame in the video stream
while video_stream.is_active():
  frame = video_stream.read_frame() #read a frame from the video stream
  detected_objects = model.detect_objects(frame) #use the object detection model to identify objects process the detected objects
  for obj in detected_objects:
    if obj.label == "sensitive":
      frame = blur_sensitive_object(frame, obj) #blur the sensitive object in the frame display the processed frame in the video call
  video_stream.show_frame(frame)

#release the video stream
video_stream.release()
```

FIG. 4.3

*Example pseudocode for alerting a user for corrective actions*

```
#define a function to alert the user
function alert_user(message):
 display_alert_box(message) #display an alert box on the screen with the given message define the main function or main loop
function main():
 #perform operations and obtain the output
 output = perform_operations()

#check if a corrective action is required based on the output
 if output == "action_required":
  alert_user("Corrective action is required! Please take necessary steps.")

#call the main function to start the process
main()
```

FIG. 4.4

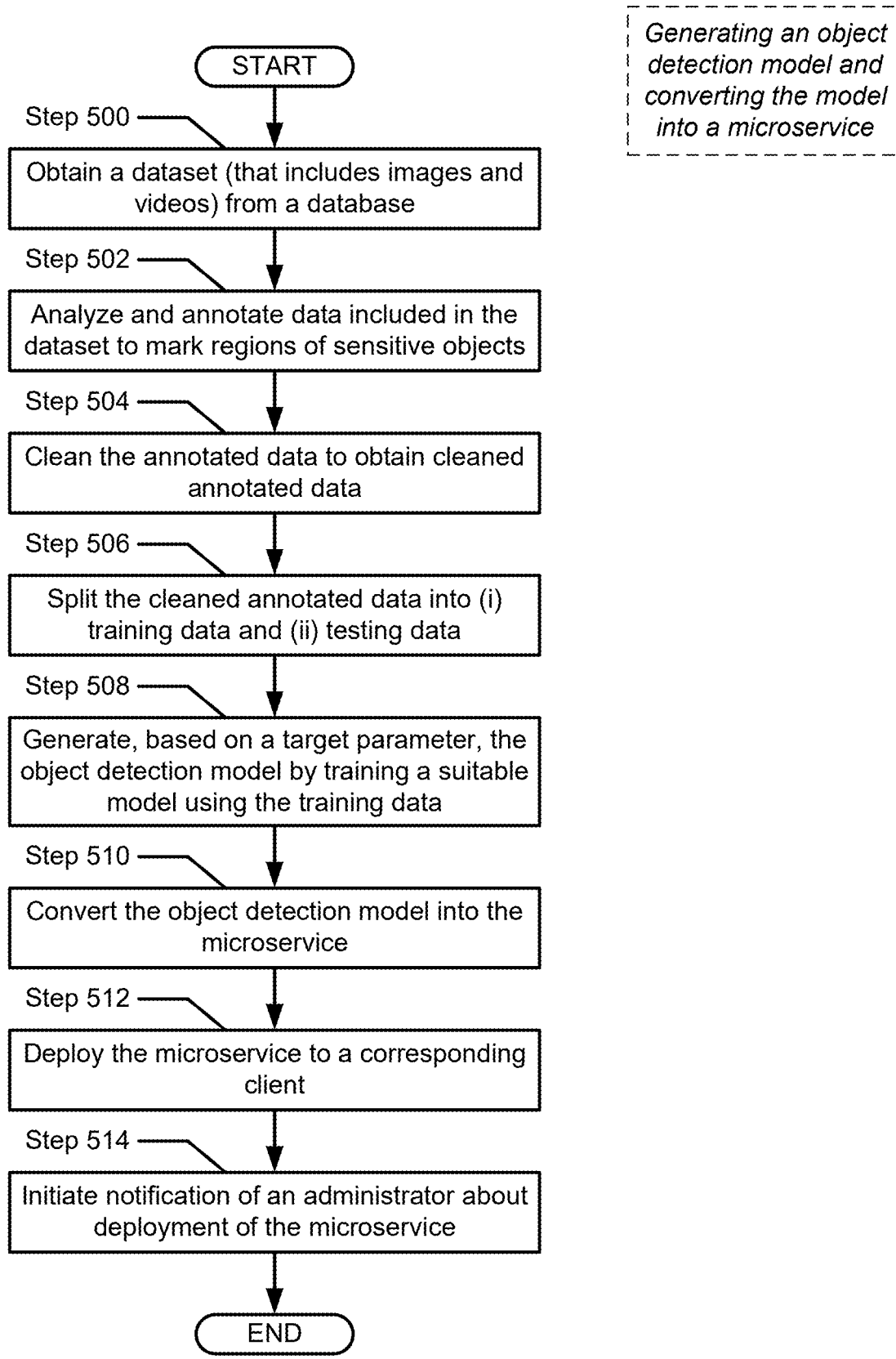
FIG. 5.1

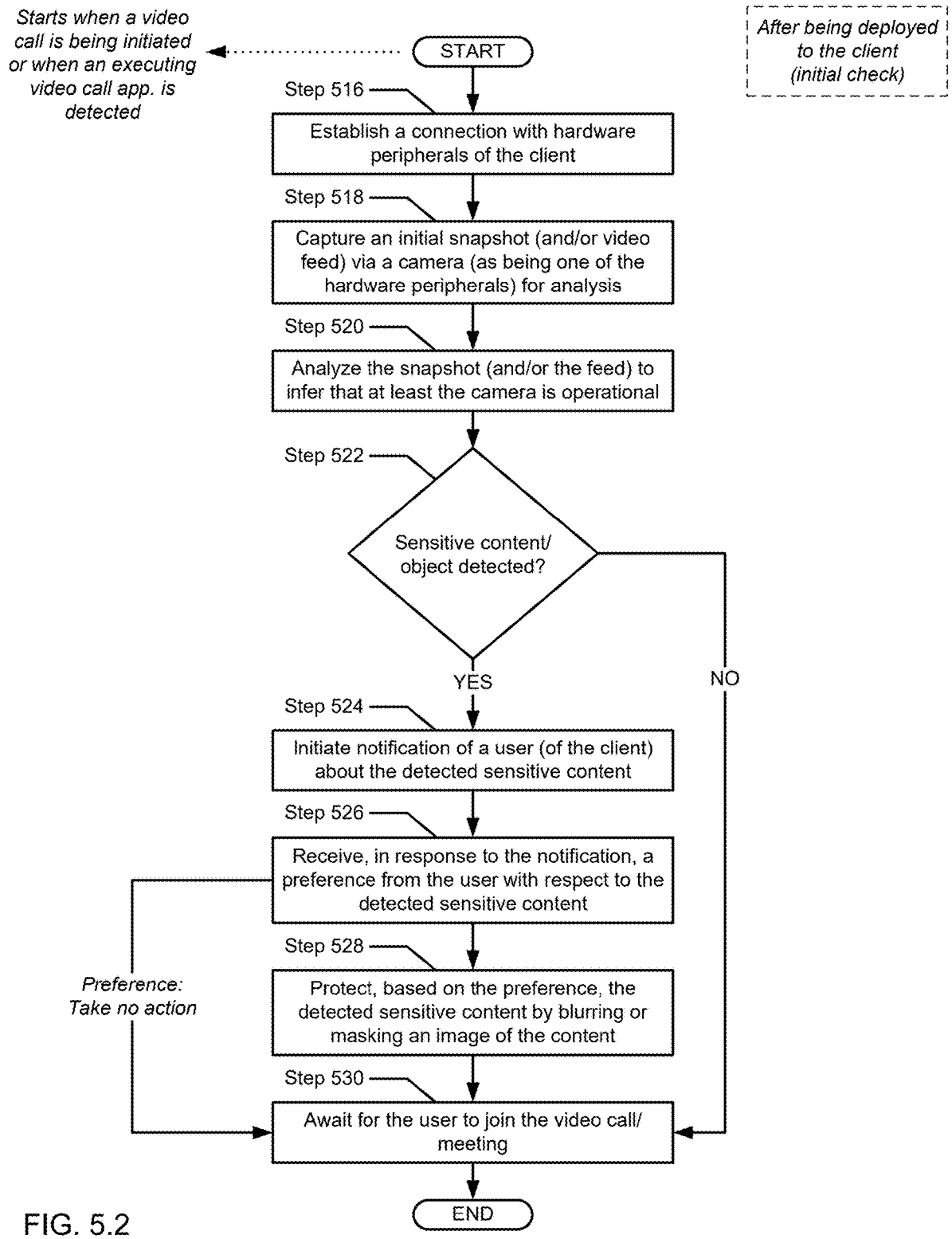
FIG. 5.2

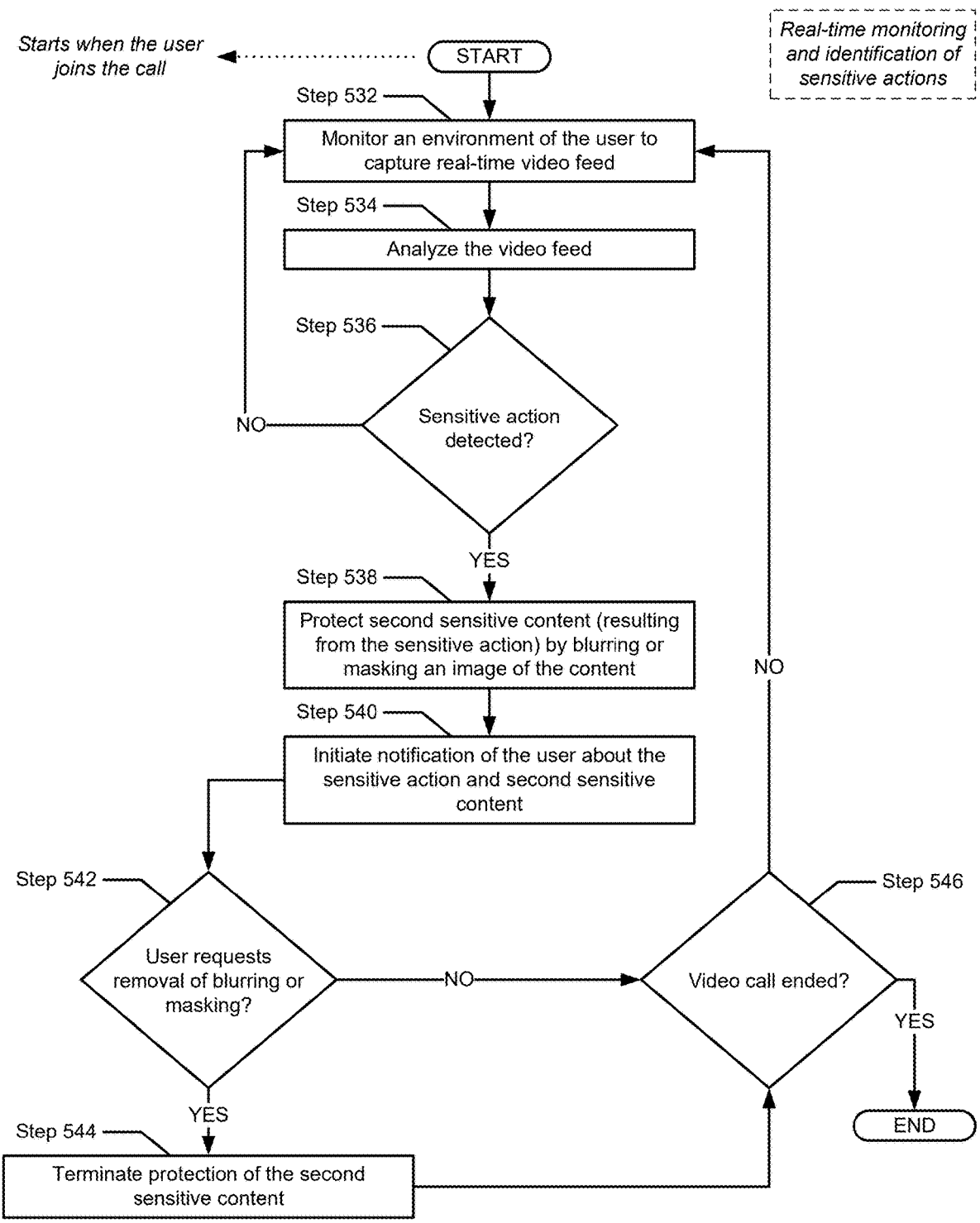
FIG. 5.3

METHOD AND SYSTEM FOR FORTIFYING USER SECURITY

BACKGROUND

Devices are often capable of performing certain functionalities that other devices are not configured to perform, or are not capable of performing. In such scenarios, it may be desirable to adapt one or more systems to enhance the functionalities of devices that cannot perform those functionalities.

BRIEF DESCRIPTION OF DRAWINGS

Certain embodiments disclosed herein will be described with reference to the accompanying drawings. However, the accompanying drawings illustrate only certain aspects or implementations of one or more embodiments disclosed herein by way of example, and are not meant to limit the scope of the claims.

FIG. 2.1 shows a diagram of an infrastructure node in accordance with one or more embodiments disclosed herein.

FIG. 2.2 shows a diagram of a client in accordance with one or more embodiments disclosed herein.

FIG. 4.1 shows example pseudocode for a microservice to establish a connection with a camera of a client in accordance with one or more embodiments disclosed herein.

FIG. 4.2 shows example pseudocode to identify whether or not one or more video conferencing applications are executing on the client in accordance with one or more embodiments disclosed herein.

FIG. 4.3 shows example pseudocode for real-time object identification in a video call in accordance with one or more embodiments disclosed herein.

FIG. 4.4 shows example pseudocode for alerting a user for corrective actions in accordance with one or more embodiments disclosed herein.

FIG. 5.1 shows a method for generating an object detection model and converting the model into a microservice in accordance with one or more embodiments disclosed herein.

FIG. 5.2 shows a method for performing an initial check of an environment (via the microservice) in accordance with one or more embodiments disclosed herein.

FIG. 5.3 shows a method for real-time monitoring and identification of sensitive actions (and sensitive objects) in the environment (via the microservice) in accordance with one or more embodiments disclosed herein.

DETAILED DESCRIPTION

Figure 1:
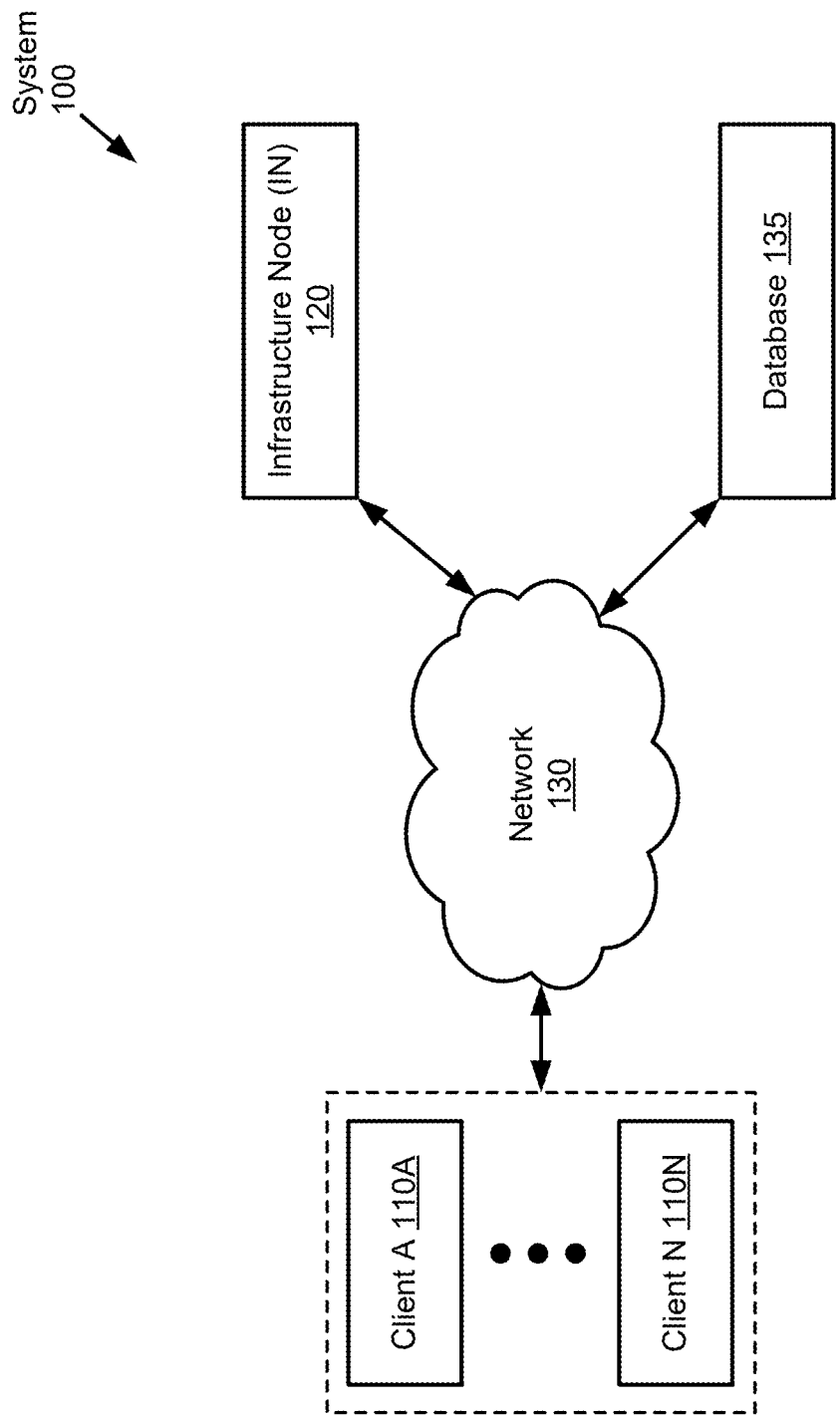
FIG. 1 shows a diagram of a system in accordance with one or more embodiments disclosed herein.

Specific embodiments disclosed herein will now be described in detail with reference to the accompanying figures. In the following detailed description of the embodiments disclosed herein, numerous specific details are set forth in order to provide a more thorough understanding of one or more embodiments disclosed herein. However, it will be apparent to one of ordinary skill in the art that the one or more embodiments disclosed herein may be practiced without these specific details. In other instances, well-known features have not been described in detail to avoid unnecessarily complicating the description.

In the following description of the figures, any component described with regard to a figure, in various embodiments disclosed herein, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments disclosed herein, any description of the components of a figure is to be interpreted as an optional embodiment, which may be implemented in addition to, in conjunction with, or in place of the embodiments described with regard to a corresponding like-named component in any other figure.

Throughout this application, elements of figures may be labeled as A to N. As used herein, the aforementioned labeling means that the element may include any number of items, and does not require that the element include the same number of elements as any other item labeled as A to N. For example, a data structure may include a first element labeled as A and a second element labeled as N. This labeling convention means that the data structure may include any number of the elements. A second data structure, also labeled as A to N, may also include any number of elements. The number of elements of the first data structure, and the number of elements of the second data structure, may be the same or different.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

As used herein, the phrase operatively connected, or operative connection, means that there exists between elements/components/devices a direct or indirect connection that allows the elements to interact with one another in some way. For example, the phrase "operatively connected" may refer to any direct connection (e.g., wired directly between two devices or components) or indirect connection (e.g., wired and/or wireless connections between any number of devices or components connecting the operatively connected devices). Thus, any path through which information may travel may be considered an operative connection.

In recent years, the lack of robust security protocols and encryption standards during digital interactions (e.g., conducted via video conferencing applications) has generated a vulnerable environment that is susceptible to malicious attacks and unauthorized access, leading to compromise of personal information and/or financial data. For example, the increased use of digital platforms has generated opportunities for cybercrime, resulting in a rise in incidents of digital theft.

The increasing prevalence of digital theft (e.g., unauthorized acquisition of personal data and credit card details during an online data process/exchange) poses a major risk of identity theft and fraudulent activities, resulting in severe financial losses and potential harm to individuals/people/ users/customers. Further, the inadequate awareness of data sharing risks during digital interactions (coupled with evolving cyber threats) necessitates, at least, robust education of individuals, advanced security measures to implement, and proactive strategies to perform in order to protect online communications among individuals. Said another way, the growing sophistication of hacking methods and identity theft has intensified the aforementioned risks and issues, emphasizing the need for comprehensive security measures to, at least, protect personal information (of individuals) during digital interactions, for example, to comply with regulatory authorities.

In most cases, cybercriminals (e.g., malicious individuals, hackers, etc.) exploit vulnerabilities in digital transactions, for example, by intercepting video calls and data exchanges (because conventional video call applications do not provide an initial check functionality (i) to monitor who can join a corresponding video call, or whether or not a person in the call is indeed the genuine person (e.g., where a malicious user may be portrayed himself/herself as the genuine person), and (ii) to determine whether or not a user is joining to the call from a public location/environment (e.g., a restaurant where the user's computing device may be exposed to a public network) or private environment (e.g., a home environment)), which compromises sensitive information and raises concerns about user data privacy.

For at least the reasons discussed above and without requiring resource-intensive efforts (e.g., time, engineering, etc.), a fundamentally different approach/framework is needed (e.g., a framework to prevent unauthorized access to digital interactions and to ensure data confidentiality (e.g., providing enhanced data privacy and security for individuals), thereby mitigating the risks associated with digital theft and preserving the integrity of online and/or offline communication channels).

Embodiments disclosed herein relate to methods and systems for fortifying user security (e.g., user data security and privacy). As a result of the processes discussed below, one or more embodiments disclosed herein advantageously ensure that: (i) an additional layer of security is provided to users so that users can enhance their data privacy and security by masking or blurring images of specific objects in their video feed (e.g., by masking or blurring an image of a sensitive object, sensitive/private information (associated with a user) remains hidden from potential prying eyes); (ii) users' data security and privacy preferences (e.g., with respect to threat detection, personalized privacy protection, etc.) are considered when blurring or masking an image of a sensitive object; (iii) for a better user experience (in terms of, at least, user data safety and privacy), real-time threat mitigation is empowered/applied through an adaptive machine learning (ML) functionality of a microservice (refer to FIG. 2.2) so that a user can combine real-time security measures with an ML model to detect and respond to security threats (e.g., to ensure that sensitive information is protected); (iv) the microservice complies with, at least, data protection regulations and/or user-defined security policies to protect personal and/or sensitive information of users; (v) incidents of digital theft are minimized (so that users are protected against, at least, financial losses and harm to their personal information); (vi) before a user joins a video call, an initial check of a corresponding environment (of the user) is performed to protect personal and/or sensitive information of the user from malicious entities (e.g., hackers, malicious hardware and/or components, etc.).

The following describes various embodiments disclosed herein.

FIG. 1 shows a diagram of a system (100) in accordance with one or more embodiments disclosed herein. The system (100) includes any number of clients (e.g., Client A (110A), Client N (110N), etc.), a network (130), any number of infrastructure nodes (IN) (e.g., 120), and a database (135). The system (100) may include additional, fewer, and/or different components without departing from the scope of the embodiments disclosed herein. Each component may be operably/operatively connected to any of the other components via any combination of wired and/or wireless connections. Each component illustrated in FIG. 1 is discussed below.

In one or more embodiments, the clients (e.g., 110A, 110N, etc.), the IN (120), the network (130), and the database (135) may be (or may include) physical hardware or logical devices, as discussed below. While FIG. 1 shows a specific configuration of the system (100), other configurations may be used without departing from the scope of the embodiments disclosed herein. For example, although the clients (e.g., 110A, 110N, etc.) and the IN (120) are shown to be operatively connected through a communication network (e.g., 130), the clients (e.g., 110A, 110N, etc.) and the IN (120) may be directly connected (e.g., without an intervening communication network).

Further, the functioning of the clients (e.g., 110A, 110N, etc.) and the IN (120) is not dependent upon the functioning and/or existence of the other components (e.g., devices) in the system (100). Rather, the clients and the IN may function independently and perform operations locally that do not require communication with other components. Accordingly, embodiments disclosed herein should not be limited to the configuration of components shown in FIG. 1.

As used herein, "communication" may refer to simple data passing, or may refer to two or more components coordinating a job. As used herein, the term "data" is intended to be broad in scope. In this manner, that term embraces, for example (but not limited to): a data stream (or stream data), data chunks, data blocks, atomic data, emails, objects of any type, files of any type (e.g., media files, spreadsheet files, database files, etc.), contacts, directories, sub-directories, volumes, etc.

In one or more embodiments, although terms such as "document", "file", "segment", "block", or "object" may be used by way of example, the principles of the present disclosure are not limited to any particular form of representing and storing data or other information. Rather, such principles are equally applicable to any object capable of representing information.

In one or more embodiments, the system (100) may be a distributed system (e.g., a data processing environment) and may deliver at least computing power (e.g., real-time (on the order of milliseconds (ms) or less) network monitoring, server virtualization, etc.), storage capacity (e.g., data backup), and data protection (e.g., software-defined data protection, disaster recovery, etc.) as a service to users of clients (e.g., 110A, 110N, etc.). For example, the system may be configured to organize unbounded, continuously generated data into a data stream. The system (100) may also represent a comprehensive middleware layer executing on computing devices (e.g., 600, FIG. 6) that supports application and storage environments.

In one or more embodiments, the system (100) may support one or more virtual machine (VM) environments, and may map capacity requirements (e.g., computational load, storage access, etc.) of VMs and supported applications to available resources (e.g., processing resources, storage resources, etc.) managed by the environments. Further, the system (100) may be configured for workload placement collaboration and computing resource (e.g., processing, storage/memory, virtualization, networking, etc.) exchange.

To provide computer-implemented services to the users, the system (100) may perform some computations (e.g., data collection, distributed processing of collected data, etc.) locally (e.g., at the users' site using the clients (e.g., 110A, 110N, etc.)) and other computations remotely (e.g., away from the users' site using the IN (120)) from the users. By doing so, the users may utilize different computing devices (e.g., 600, FIG. 6) that have different quantities of computing resources (e.g., processing cycles, memory, storage, etc.) while still being afforded a consistent user experience. For example, by performing some computations remotely, the system (100) (*i*) may maintain the consistent user experience provided by different computing devices even when the different computing devices possess different quantities of computing resources, and (ii) may process data more efficiently in a distributed manner by avoiding the overhead associated with data distribution and/or command and control via separate connections.

As used herein, "computing" refers to any operations that may be performed by a computer, including (but not limited to): computation, data storage, data retrieval, communications, etc. Further, as used herein, a "computing device" refers to any device in which a computing operation may be carried out. A computing device may be, for example (but not limited to): a compute component, a storage component, a network device, a telecommunications component, etc.

As used herein, a "resource" refers to any program, application, document, file, asset, executable program file, desktop environment, computing environment, or other resource made available to, for example, a user/customer of a client (described below). The resource may be delivered to the client via, for example (but not limited to): conventional installation, a method for streaming, a VM executing on a remote computing device, execution from a removable storage device connected to the client (such as universal serial bus (USB) device), etc.

In one or more embodiments, a client (e.g., 110A, 110N, etc.) may include functionality to, e.g.,: (i) capture sensory input (e.g., sensor data) in the form of text, audio, video, touch or motion, (ii) collect massive amounts of data at the edge of an Internet of Things (IoT) network (where, the collected data may be grouped as: (a) data that needs no further action and does not need to be stored, (b) data that should be retained for later analysis and/or record keeping, and (c) data that requires an immediate action/response), (iii) provide to other entities (e.g., the IN (120)), store, or otherwise utilize captured sensor data (and/or any other type and/or quantity of data), and (iv) provide surveillance services (e.g., determining object-level information, performing face recognition, etc.) for scenes (e.g., a physical region of space). One of ordinary skill will appreciate that the client may perform other functionalities without departing from the scope of the embodiments disclosed herein.

In one or more embodiments, the clients (e.g., 110A, 110N, etc.) may be geographically distributed devices (e.g., user devices, front-end devices, etc.) and may have relatively restricted hardware and/or software resources when compared to the IN (120). As being, for example, a sensing device, each of the clients may be adapted to provide monitoring services. For example, a client may monitor the state of a scene (e.g., objects disposed in a scene). The monitoring may be performed by obtaining sensor data from sensors that are adapted to obtain information regarding the scene, in which a client may include and/or be operatively coupled to one or more sensors (e.g., a physical device adapted to obtain information regarding one or more scenes).

In one or more embodiments, the sensor data may be any quantity and types of measurements (e.g., of a scene's properties, of an environment's properties, etc.) over any period(s) of time and/or at any points-in-time (e.g., any type of information obtained from one or more sensors, in which different portions of the sensor data may be associated with different periods of time (when the corresponding portions of sensor data were obtained)). The sensor data may be obtained using one or more sensors. The sensor may be, for example (but not limited to): a visual sensor (e.g., a camera (e.g., 214, FIG. 2.2) adapted to obtain optical information (e.g., a pattern of light scattered off of the scene) regarding a scene/environment), an audio sensor (e.g., a microphone adapted to obtain auditory information (e.g., a pattern of sound from the scene) regarding a scene), an electromagnetic radiation sensor (e.g., an infrared sensor), a chemical detection sensor, a temperature sensor, a humidity sensor, a count sensor, a distance sensor, a global positioning system sensor, a biological sensor, a differential pressure sensor, a corrosion sensor, etc.

In one or more embodiments, the clients (e.g., 110A, 110N, etc.) may be physical or logical computing devices configured for hosting one or more workloads, or for providing a computing environment whereon workloads may be implemented. The clients may provide computing environments that are configured for, at least: (i) workload placement collaboration, (ii) computing resource (e.g., processing, storage/memory, virtualization, networking, etc.) exchange, and (iii) protecting workloads (including their applications and application data) of any size and scale (based on, for example, one or more service level agreements (SLAs) configured by users of the clients). The clients (e.g., 110A, 110N, etc.) may correspond to computing devices that one or more users use to interact with one or more components of the system (100).

In one or more embodiments, a client (e.g., 110A, 110N, etc.) may include any number of applications (and/or content accessible through the applications) that provide computer-implemented services to a user. Applications may be designed and configured to perform one or more functions instantiated by a user of the client. In order to provide application services, each application may host similar or different components. The components may be, for example (but not limited to): instances of databases, instances of email servers, etc. Applications may be executed on one or more clients as instances of the application.

Applications may vary in different embodiments, but in certain embodiments, applications may be custom developed or commercial (e.g., off-the-shelf) applications that a user desires to execute in a client (e.g., 110A, 110N, etc.). In one or more embodiments, applications may be logical entities executed using computing resources of a client. For example, applications may be implemented as computer instructions stored on persistent storage of the client that when executed by the processor(s) of the client, cause the client to provide the functionality of the applications described throughout the application.

In one or more embodiments, while performing, for example, one or more operations requested by a user, applications (including a microservice (e.g., 212, FIG. 2.2)) installed on a client (e.g., 110A, 110N, etc.) may include functionality to request and use physical and logical resources of the client. Applications may also include functionality to use data stored in storage/memory resources of the client. The applications may perform other types of functionalities not listed above without departing from the scope of the embodiments disclosed herein. While providing application services to a user, applications may store data that may be relevant to the user in storage/memory resources of the client.

In one or more embodiments, to provide services to the users, the clients (e.g., 110A, 110N, etc.) may utilize, rely on, or otherwise cooperate with the IN (120). For example, the clients may issue requests to the IN to receive responses and interact with various components of the IN. The clients may also request data from and/or send data to the IN (for example, the clients may transmit information to the IN that allows the IN to perform computations, the results of which are used by the clients to provide services to the users). As yet another example, the clients may utilize computer-implemented services provided by the IN. When the clients interact with the IN, data that is relevant to the clients may be stored (temporarily or permanently) in the IN.

In one or more embodiments, a client (e.g., 110A, 110N, etc.) may be capable of, e.g.,: (i) collecting users' inputs, (ii) correlating collected users' inputs to the computer-implemented services to be provided to the users, (iii) communicating with the IN (120) that perform computations necessary to provide the computer-implemented services, (iv) using the computations performed by the IN to provide the computer-implemented services in a manner that appears (to the users) to be performed locally to the users, and/or (v) communicating with any virtual desktop (VD) in a virtual desktop infrastructure (VDI) environment (or a virtualized architecture) provided by the IN (using any known protocol in the art), for example, to exchange remote desktop traffic or any other regular protocol traffic (so that, once authenticated, users may remotely access independent VDs).

As described above, the clients (e.g., 110A, 110N, etc.) may provide computer-implemented services to users (and/or other computing devices). The clients may provide any number and any type of computer-implemented services. To provide computer-implemented services, each client may include a collection of physical components (e.g., processing resources, storage/memory resources, networking resources, etc.) configured to perform operations of the client and/or otherwise execute a collection of logical components (e.g., virtualization resources) of the client.

In one or more embodiments, a processing resource (not shown) may refer to a measurable quantity of a processing-relevant resource type, which can be requested, allocated, and consumed. A processing-relevant resource type may encompass a physical device (i.e., hardware), a logical intelligence (i.e., software), or a combination thereof, which may provide processing or computing functionality and/or services. Examples of a processing-relevant resource type may include (but not limited to): a central processing unit (CPU), a graphics processing unit (GPU), a data processing unit (DPU), a computation acceleration resource, an application-specific integrated circuit (ASIC), a digital signal processor for facilitating high speed communication, etc.

In one or more embodiments, a storage or memory resource (not shown) may refer to a measurable quantity of a storage/memory-relevant resource type, which can be requested, allocated, and consumed (for example, to store sensor data and provide previously stored data). A storage/memory-relevant resource type may encompass a physical device, a logical intelligence, or a combination thereof, which may provide temporary or permanent data storage functionality and/or services. Examples of a storage/memory-relevant resource type may be (but not limited to): a hard disk drive (HDD), a solid-state drive (SSD), random access memory (RAM), Flash memory, a tape drive, a fibre-channel (FC) based storage device, a floppy disk, a diskette, a compact disc (CD), a digital versatile disc (DVD), a non-volatile memory express (NVMe) device, a NVMe over Fabrics (NVMe-oF) device, resistive RAM (ReRAM), persistent memory (PMEM), virtualized storage, virtualized memory, etc.

In one or more embodiments, while the clients (e.g., 110A, 110N, etc.) provide computer-implemented services to users, the clients may store data that may be relevant to the users to the storage/memory resources. When the user-relevant data is stored (temporarily or permanently), the user-relevant data may be subjected to loss, inaccessibility, or other undesirable characteristics based on the operation of the storage/memory resources.

To mitigate, limit, and/or prevent such undesirable characteristics, users of the clients (e.g., 110A, 110N, etc.) may enter into agreements (e.g., SLAs) with providers (e.g., vendors) of the storage/memory resources. These agreements may limit the potential exposure of user-relevant data to undesirable characteristics. These agreements may, for example, require duplication of the user-relevant data to other locations so that if the storage/memory resources fail, another copy (or other data structure usable to recover the data on the storage/memory resources) of the user-relevant data may be obtained. These agreements may specify other types of activities to be performed with respect to the storage/memory resources without departing from the scope of the embodiments disclosed herein.

In one or more embodiments, a networking resource (not shown) may refer to a measurable quantity of a networking-relevant resource type, which can be requested, allocated, and consumed. A networking-relevant resource type may encompass a physical device, a logical intelligence, or a combination thereof, which may provide network connectivity functionality and/or services. Examples of a networking-relevant resource type may include (but not limited to): a network interface card (NIC), a network adapter, a network processor, etc.

In one or more embodiments, a networking resource may provide capabilities to interface a client with external entities (e.g., the IN (120)) and to allow for the transmission and receipt of data with those entities. A networking resource may communicate via any suitable form of wired interface (e.g., Ethernet, fiber optic, serial communication etc.) and/or wireless interface, and may utilize one or more protocols (e.g., transport control protocol (TCP), user datagram protocol (UDP), Remote Direct Memory Access, IEEE 801.11, etc.) for the transmission and receipt of data.

In one or more embodiments, a networking resource may implement and/or support the above-mentioned protocols to enable the communication between the client and the external entities. For example, a networking resource may enable the client to be operatively connected, via Ethernet, using a TCP protocol to form a "network fabric", and may enable the communication of data between the client and the external entities. In one or more embodiments, each client may be given a unique identifier (e.g., an Internet Protocol (IP) address) to be used when utilizing the above-mentioned protocols.

Further, a networking resource, when using a certain protocol or a variant thereof, may support streamlined access to storage/memory media of other clients (e.g., 110A, 110N, etc.). For example, when utilizing remote direct memory access (RDMA) to access data on another client, it may not be necessary to interact with the logical components of that client. Rather, when using RDMA, it may be possible for the networking resource to interact with the physical components of that client to retrieve and/or transmit data, thereby avoiding any higher-level processing by the logical components executing on that client.

In one or more embodiments, a virtualization resource (not shown) may refer to a measurable quantity of a virtualization-relevant resource type (e.g., a virtual hardware component), which can be requested, allocated, and consumed, as a replacement for a physical hardware component. A virtualization-relevant resource type may encompass a physical device, a logical intelligence, or a combination thereof, which may provide computing abstraction functionality and/or services. Examples of a virtualization-relevant resource type may include (but not limited to): a virtual server, a VM, a container, a virtual CPU (vCPU), a virtual storage pool, etc.

In one or more embodiments, a virtualization resource may include a hypervisor (e.g., a VM monitor), in which the hypervisor may be configured to orchestrate an operation of, for example, a VM by allocating computing resources of a client (e.g., 110A, 110N, etc.) to the VM. In one or more embodiments, the hypervisor may be a physical device including circuitry. The physical device may be, for example (but not limited to): a field-programmable gate array (FPGA), an application-specific integrated circuit, a programmable processor, a microcontroller, a digital signal processor, etc. The physical device may be adapted to provide the functionality of the hypervisor. Alternatively, in one or more of embodiments, the hypervisor may be implemented as computer instructions stored on storage/memory resources of the client that when executed by processing resources of the client, cause the client to provide the functionality of the hypervisor.

Additional details of a client are described below in reference to FIG. 2.2.

In one or more embodiments, a client (e.g., 110A, 110N, etc.) may be, for example (but not limited to): a physical computing device, a smartphone, a tablet, a wearable, a gadget, a closed-circuit television (CCTV) camera, a music player, a game controller, etc. Different clients may have different computational capabilities. In one or more embodiments, Client A (110A) may have 16 gigabytes (GB) of dynamic RAM (DRAM) and 1 CPU with 12 cores, whereas Client N (110N) may have 8 GB of PMEM and 1 CPU with 16 cores. Other different computational capabilities of the clients not listed above may also be taken into account without departing from the scope of the embodiments disclosed herein.

Figure 6:
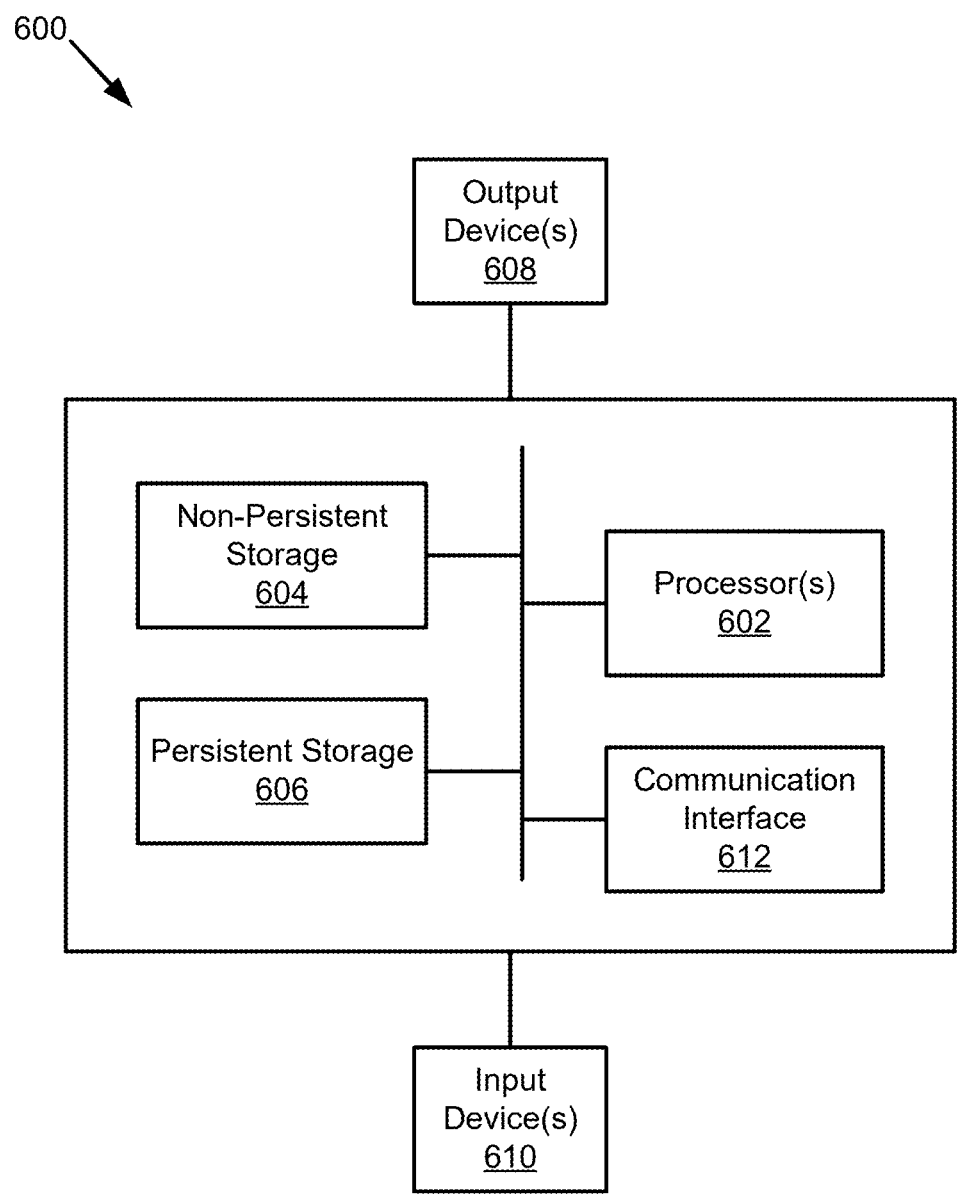
FIG. 6 shows a diagram of a computing device in accordance with one or more embodiments disclosed herein.

Further, in one or more embodiments, a client (e.g., 110A, 110N, etc.) may be implemented as a computing device (e.g., 600, FIG. 6). The computing device may be, for example, a desktop computer, a server, a distributed computing system, or a cloud resource. The computing device may include one or more processors, memory (e.g., RAM), and persistent storage (e.g., disk drives, SSDs, etc.). The computing device may include instructions, stored in the persistent storage, that when executed by the processor(s) of the computing device cause the computing device to perform the functionality of the client described throughout the application.

Alternatively, in one or more embodiments, the client (e.g., 110A, 110N, etc.) may be implemented as a logical device (e.g., a VM). The logical device may utilize the computing resources of any number of computing devices to provide the functionality of the client described throughout this application.

In one or more embodiments, users (e.g., customers, administrators, people, etc.) may interact with (or operate) the clients (e.g., 110A, 110N, etc.) in order to perform work-related tasks (e.g., production workloads). In one or more embodiments, the accessibility of users to the clients may depend on a regulation set by an administrator of the clients. To this end, each user may have a personalized user account that may, for example, grant access to certain data, applications, and computing resources of the clients. This may be realized by implementing the virtualization technology. In one or more embodiments, an administrator may be a user with permission (e.g., a user that has root-level access) to make changes on the clients that will affect other users of the clients.

In one or more embodiments, for example, a user may be automatically directed to a login screen of a client when the user connected to that client. Once the login screen of the client is displayed, the user may enter credentials (e.g., username, password, etc.) of the user on the login screen. The login screen may be a graphical user interface (GUI) generated by a visualization module (not shown) of the client. In one or more embodiments, the visualization module may be implemented in hardware (e.g., circuitry), software, or any combination thereof.

In one or more embodiments, a GUI may be displayed on a display of a computing device (e.g., 600, FIG. 6) using functionalities of a display engine (not shown), in which the display engine is operatively connected to the computing device. The display engine may be implemented using hardware (or a hardware component), software (or a software component), or any combination thereof. The login screen may be displayed in any visual format that would allow the user to easily comprehend (e.g., read and parse) the listed information.

In one or more embodiments, the IN (120) may include (i) a chassis (e.g., a mechanical structure, a rack mountable enclosure, etc.) configured to house one or more servers (or blades) and their components and (ii) any instrumentality or aggregate of instrumentalities operable to compute, classify, process, transmit, receive, retrieve, originate, switch, store, display, manifest, detect, record, reproduce, handle, and/or utilize any form of data for business, management, entertainment, or other purposes.

In one or more embodiments, the IN (120) may include functionality to, e.g.,: (i) obtain (or receive) data (e.g., any type and/or quantity of input) from any source (and, if necessary, aggregate the data); (ii) perform complex analytics and analyze data that is received from one or more clients (e.g., 110A, 110N, etc.) to generate additional data that is derived from the obtained data without experiencing any middleware and hardware limitations; (iii) provide meaningful information (e.g., a response) back to the corresponding clients; (iv) filter data (e.g., received from a client) before pushing the data (and/or the derived data) to the database (135) for management of the data and/or for storage of the data (while pushing the data, the IN may include information regarding a source of the data (e.g., an identifier of the source) so that such information may be used to associate provided data with one or more of the users (or data owners)); (v) host and maintain various workloads; (vi) provide a computing environment whereon workloads may be implemented (e.g., employing linear, non-linear, and/or ML models to perform cloud-based data processing); (vii) incorporate strategies (e.g., strategies to provide VDI capabilities) for remotely enhancing capabilities of the clients; (viii) provide robust security features to the clients and make sure that a minimum level of service is always provided to a user of a client; (ix) transmit the result(s) of the computing work performed (e.g., real-time business insights, equipment maintenance predictions, other actionable responses, etc.) to another IN (not shown) for review and/or other human interactions; (x) exchange data with other devices registered in/to the network (130) in order to, for example, participate in a collaborative workload placement (e.g., the node may split up a request (e.g., an operation, a task, an activity, etc.) with another IN, coordinating its efforts to complete the request more efficiently than if the IN had been responsible for completing the request); (xi) provide software-defined data protection for the clients (e.g., 110A, 110N, etc.); (xii) provide automated data discovery, protection, management, and recovery operations for the clients; (xiii) monitor operational states of the clients; (xiv) regularly back up configuration information of the clients to the database (135); (xv) provide (e.g., via a broadcast, multicast, or unicast mechanism) information (e.g., a location identifier, the amount of available resources, etc.) associated with the IN to other INs of the system (100); (xvi) configure or control any mechanism that defines when, how, and what data to provide to the clients and/or database; (xvii) provide data deduplication; (xviii) orchestrate data protection through one or more GUIs; (xix) empower data owners (e.g., users of the clients) to perform self-service data backup and restore operations from their native applications; (xx) ensure compliance and satisfy different types of service level objectives (SLOs) set by an administrator/user; (xxi) increase resiliency of an organization by enabling rapid recovery or cloud disaster recovery from cyber incidents; (xxii) provide operational simplicity, agility, and flexibility for physical, virtual, and cloud-native environments; (xxiii) consolidate multiple data process or protection requests (received from, for example, clients) so that duplicative operations (which may not be useful for restoration purposes) are not generated; (xxiv) initiate multiple data process or protection operations in parallel (e.g., an IN may host multiple operations, in which each of the multiple operations may (a) manage the initiation of a respective operation and (b) operate concurrently to initiate multiple operations); and/or (xxv) manage operations of one or more clients (e.g., receiving information from the clients regarding changes in the operation of the clients) to improve their operations (e.g., improve the quality of data being generated, decrease the computing resources cost of generating data, etc.). In one or more embodiments, in order to read, write, or store data, the IN (120) may communicate with, for example, the database (135) and/or other storage devices in the system (100).

As described above, the IN (120) may be capable of providing a range of functionalities/services to the users of the clients (e.g., 110A, 110N, etc.). However, not all of the users may be allowed to receive all of the services. To manage the services provided to the users of the clients, a system (e.g., a service manager) in accordance with embodiments disclosed herein may manage the operation of a network (e.g., 130), in which the clients are operably connected to the IN. Specifically, the service manager (i) may identify services to be provided by the IN (for example, based on the number of users using the clients) and (ii) may limit communications of the clients to receive IN provided services.

For example, the priority (e.g., the user access level) of a user may be used to determine how to manage computing resources of the IN (120) to provide services to that user. As yet another example, the priority of a user may be used to identify the services that need to be provided to that user. As yet another example, the priority of a user may be used to determine how quickly communications (for the purposes of providing services in cooperation with the internal network (and its subcomponents)) are to be processed by the internal network.

Further, consider a scenario where a first user is to be treated as a normal user (e.g., a non-privileged user, a user with a user access level/tier of 4/10). In such a scenario, the user level of that user may indicate that certain ports (of the subcomponents of the network (130) corresponding to communication protocols such as the TCP, the UDP, etc.) are to be opened, other ports are to be blocked/disabled so that (i) certain services are to be provided to the user by the IN (120) (e.g., while the computing resources of the IN may be capable of providing/performing any number of remote computer-implemented services, they may be limited in providing some of the services over the network (130)) and (ii) network traffic from that user is to be afforded a normal level of quality (e.g., a normal processing rate with a limited communication bandwidth (BW)). By doing so, (i) computer-implemented services provided to the users of the clients (e.g., 110A, 110N, etc.) may be granularly configured without modifying the operation(s) of the clients and (ii) the overhead for managing the services of the clients may be reduced by not requiring modification of the operation(s) of the clients directly.

In contrast, a second user may be determined to be a high priority user (e.g., a privileged user, a user with a user access level of 9/10). In such a case, the user level of that user may indicate that more ports are to be opened than were for the first user so that (i) the IN (120) may provide more services to the second user and (ii) network traffic from that user is to be afforded a high-level of quality (e.g., a higher processing rate than the traffic from the normal user).

As used herein, a "workload" is a physical or logical component configured to perform certain work functions. Workloads may be instantiated and operated while consuming computing resources allocated thereto. A user may configure a data protection policy for various workload types. Examples of a workload may include (but not limited to): a data protection workload, a VM, a container, a network-attached storage (NAS), a database, an application, a collection of microservices, a file system (FS), small workloads with lower priority workloads (e.g., FS host data, operating system (OS) data, etc.), medium workloads with higher priority (e.g., VM with FS data, network data management protocol (NDMP) data, etc.), large workloads with critical priority (e.g., mission critical application data), etc.

Further, while a single IN (e.g., 120) is considered above, the term "node" includes any collection of systems or sub-systems that individually or jointly execute a set, or multiple sets, of instructions to provide one or more computer-implemented services. For example, a single IN may provide a computer-implemented service on its own (i.e., independently) while multiple other nodes may provide a second computer-implemented service cooperatively (e.g., each of the multiple other nodes may provide similar and or different services that form the cooperatively provided service).

As described above, the IN (120) may provide any quantity and any type of computer-implemented services. To provide computer-implemented services, the IN may be a heterogeneous set, including a collection of physical components/resources (discussed above) configured to perform operations of the node and/or otherwise execute a collection of logical components/resources (discussed above) of the node.

In one or more embodiments, the IN (120) may implement a management model to manage the aforementioned computing resources in a particular manner. The management model may give rise to additional functionalities for the computing resources. For example, the management model may automatically store multiple copies of data in multiple locations when a single write of the data is received. By doing so, a loss of a single copy of the data may not result in a complete loss of the data. Other management models may include, for example, adding additional information to stored data to improve its ability to be recovered, methods of communicating with other devices to improve the likelihood of receiving the communications, etc. Any type and number of management models may be implemented to provide additional functionalities using the computing resources without departing from the scope of the embodiments disclosed herein.

One of ordinary skill will appreciate that the IN (120) may perform other functionalities without departing from the scope of the embodiments disclosed herein. In one or more embodiments, the IN may be configured to perform (in conjunction with the database (135)) all, or a portion, of the functionalities described in FIG. 5.1.

In one or more embodiments, the IN (120) may be implemented as a computing device (e.g., 600, FIG. 6). The computing device may be, for example, a mobile phone, a tablet computer, a laptop computer, a desktop computer, a server, a distributed computing system, or a cloud resource. The computing device may include one or more processors, memory (e.g., RAM), and persistent storage (e.g., disk drives, SSDs, etc.). The computing device may include instructions, stored in the persistent storage, that when executed by the processor(s) of the computing device cause the computing device to perform the functionality of the IN described throughout the application.

Alternatively, in one or more embodiments, similar to a client (e.g., 110A, 110N, etc.), the IN (120) may also be implemented as a logical device.

In one or more embodiments, the IN (120) may host an analyzer (e.g., 202, FIG. 2.1), an engine (e.g., 204, FIG. 2.1), and a visualizer (e.g., 206, FIG. 2.1). Additional details of the analyzer, engine, and visualizer are described below in reference to FIG. 2.1. In the embodiments of the present disclosure, the database (135) is demonstrated as a separate entity from the IN (120); however, embodiments disclosed herein are not limited as such. The database (135) may be demonstrated as a part of the IN (e.g., as deployed to the IN).

In one or more embodiments, all, or a portion, of the components of the system (100) may be operably connected each other and/or other entities via any combination of wired and/or wireless connections. For example, the aforementioned components may be operably connected, at least in part, via the network (130). Further, all, or a portion, of the components of the system (100) may interact with one another using any combination of wired and/or wireless communication protocols.

In one or more embodiments, the network (130) may represent a (decentralized or distributed) computing network and/or fabric configured for computing resource and/or messages exchange among registered computing devices (e.g., the clients, the IN, etc.). As discussed above, components of the system (100) may operatively connect to one another through the network (e.g., a storage area network (SAN), a personal area network (PAN), a LAN, a metropolitan area network (MAN), a WAN, a mobile network, a wireless LAN (WLAN), a virtual private network (VPN), an intranet, the Internet, etc.), which facilitates the communication of signals, data, and/or messages. In one or more embodiments, the network (130) may be implemented using any combination of wired and/or wireless network topologies, and the network may be operably connected to the Internet or other networks. Further, the network (130) may enable interactions between, for example, the clients and the IN through any number and type of wired and/or wireless network protocols (e.g., TCP, UDP, IPv4, etc.).

The network (130) may encompass various interconnected, network-enabled subcomponents (not shown) (e.g., switches, routers, gateways, cables etc.) that may facilitate communications between the components of the system (100). In one or more embodiments, the network-enabled subcomponents may be capable of: (i) performing one or more communication schemes (e.g., IP communications, Ethernet communications, etc.), (ii) being configured by one or more components in the network, and (iii) limiting communication(s) on a granular level (e.g., on a per-port level, on a per-sending device level, etc.). The network (130) and its subcomponents may be implemented using hardware, software, or any combination thereof.

In one or more embodiments, before communicating data over the network (130), the data may first be broken into smaller batches (e.g., data packets) so that larger size data can be communicated efficiently. For this reason, the network-enabled subcomponents may break data into data packets. The network-enabled subcomponents may then route each data packet in the network (130) to distribute network traffic uniformly.

In one or more embodiments, the network-enabled subcomponents may decide how real-time (e.g., on the order of ms or less) network traffic and non-real-time network traffic should be managed in the network (130). In one or more embodiments, the real-time network traffic may be high-priority (e.g., urgent, immediate, etc.) network traffic. For this reason, data packets of the real-time network traffic may need to be prioritized in the network (130). The real-time network traffic may include data packets related to, for example (but not limited to): videoconferencing, web browsing, voice over Internet Protocol (VOIP), etc.

Turning now to the database (135), the database (135) may provide long-term, durable, high read/write throughput data storage/protection with near-infinite scale and low-cost. The database (135) may be a fully managed cloud/remote (or local) storage (e.g., pluggable storage, object storage, block storage, file system storage, data stream storage, Web servers, unstructured storage, etc.) that acts as a shared storage/memory resource that is functional to store unstructured and/or structured data. Further, the database (135) may also occupy a portion of a physical storage/memory device or, alternatively, may span across multiple physical storage/memory devices.

In one or more embodiments, the database (135) may be implemented using physical devices that provide data storage services (e.g., storing data and providing copies of previously stored data). The devices that provide data storage services may include hardware devices and/or logical devices. For example, the database (135) may include any quantity and/or combination of memory devices (i.e., volatile storage), long-term storage devices (i.e., persistent storage), other types of hardware devices that may provide short-term and/or long-term data storage services, and/or logical storage devices (e.g., virtual persistent storage/virtual volatile storage).

For example, the database (135) may include a memory device (e.g., a dual in-line memory device), in which data is stored and from which copies of previously stored data are provided. As yet another example, the database (135) may include a persistent storage device (e.g., an SSD), in which data is stored and from which copies of previously stored data is provided. As yet another example, the database (135) may include (i) a memory device in which data is stored and from which copies of previously stored data are provided and (ii) a persistent storage device that stores a copy of the data stored in the memory device (e.g., to provide a copy of the data in the event that power loss or other issues with the memory device that may impact its ability to maintain the copy of the data).

Further, the database (135) may also be implemented using logical storage. Logical storage (e.g., virtual disk) may be implemented using one or more physical storage devices whose storage resources (all, or a portion) are allocated for use using a software layer. Thus, logical storage may include both physical storage devices and an entity executing on a processor or another hardware device that allocates storage resources of the physical storage devices.

In one or more embodiments, the database (135) may store/record unstructured and/or structured data that may include (or specify), for example (but not limited to): an identifier of a user/customer (e.g., a unique string or combination of bits associated with a particular user); a request received from a user (or a user's account); a geographic location (e.g., a country) associated with the user; a timestamp showing when a specific request is processed by an application; a port number (e.g., associated with a hardware component of a client (e.g., 110A)); a protocol type associated with a port number; computing resource details (including details of hardware components and/or software components) and an IP address of an IN (e.g., 120) hosting an application where a specific request is processed; an identifier of an application; information with respect to historical metadata (e.g., system logs, applications logs, telemetry data including past and present device usage of one or more computing devices in the system (100), etc.); computing resource details and an IP address of a client that sent a specific request (e.g., to the IN (120)); one or more points-in-time and/or one or more periods of time associated with a data recovery event; data for execution of applications/services (including IN applications and associated endpoints); corpuses of annotated data used to build/generate and train processing classifiers for trained ML models; linear, non-linear, and/or ML model parameters (e.g., instructions to the engine (e.g., 204, FIG. 2.1) on how to train and/or fine-tune a model); an identifier of a sensor; a product identifier of a client (e.g., 110A); a type of a client; historical sensor data/input (e.g., visual sensor data, audio sensor data, electromagnetic radiation sensor data, temperature sensor data, humidity sensor data, corrosion sensor data, etc., in the form of text, audio, video, touch, and/or motion) and its corresponding details; an identifier of a data item; a size of the data item; a distributed model identifier that uniquely identifies a distributed model; a user activity performed on a data item; a cumulative history of user/administrator activity records obtained over a prolonged period of time; a setting (and a version) of a mission critical application executing on an IN (e.g., 120); an SLA/SLO set by a user; a data protection policy (e.g., an affinity-based backup policy) implemented by a user (e.g., to protect a local data center, to perform a rapid recovery, etc.); a configuration setting of that policy; product configuration information associated with a client; a number of each type of a set of assets protected by an IN (e.g., 120); a size of each of the set of assets protected; a number of each type of a set of data protection policies implemented by a user; configuration information associated with the analyzer (e.g., 202, FIG. 2.1) (to manage security, network traffic, network access, or any other function/operation performed by the analyzer); configuration information associated with the engine (e.g., 204, FIG. 2.1) (to manage security, network traffic, network access, or any other function/operation performed by the engine); a job detail of a job (e.g., a data protection job, a data restoration job, a log retention job, etc.) that has been initiated by an IN (e.g., 120); a type of the job (e.g., a non-parallel processing job, a parallel processing job, an analytics job, etc.); information associated with a hardware resource set (discussed below) of the IN (120); a completion timestamp encoding a date and/or time reflective of a successful completion of a job; a time duration reflecting the length of time expended for executing and completing a job; a backup retention period associated with a data item; a status of a job (e.g., how many jobs are still active, how many jobs are completed, etc.); a number of requests handled (in parallel) per minute (or per second, per hour, etc.) by the analyzer; a number of errors encountered when handling a job; a documentation that shows how the analyzer performs against an SLO and/or an SLA; information regarding an administrator (e.g., a high priority trusted administrator, a low priority trusted administrator, etc.) related to an analytics job; a workflow (e.g., a policy that dictates how a workload should be configured and/or protected, such as an SQL workflow dictates how a structured query language (SQL) workload should be protected) set (by a user); a type of a workload that is tested/validated by an administrator per data protection policy; a practice recommended by a vendor (e.g., a single data protection policy should not protect more than 100 assets; for a dynamic NAS, maximum one billion files can be protected per day, etc.); one or more device state paths corresponding to a device (e.g., a client); an existing knowledge base (KB) article; a technical support history documentation of a customer/user; a port's user guide; a port's release note; a community forum question and its associated answer; a catalog file of an application upgrade; details of a compatible OS version for an application upgrade to be installed; an application upgrade sequence; a solution or a workaround document for a software failure; one or more lists that specify which computer-implemented services should be provided to which user (depending on a user access level of a user); a fraud report for an invalid user; a set of SLAs (e.g., an agreement that indicates a period of time required to retain a profile of a user); information with respect to a user/customer experience; images and videos (e.g., that would reflect a user's daily life and activities) from any source; etc.

In one or more embodiments, information associated with a hardware resource set (e.g., including at least resource related parameters) may specify, for example (but not limited to): a configurable CPU option (e.g., a valid/legitimate vCPU count per IN in the system (100)), a configurable network resource option (e.g., enabling/disabling single-root input/output virtualization (SR-IOV) for the IN (120)), a configurable memory option (e.g., maximum and minimum memory per IN in the system (100)), a configurable GPU option (e.g., allowable scheduling policy and/or virtual GPU (vGPU) count combinations per IN in the system (100)), a configurable DPU option (e.g., legitimacy of disabling inter-integrated circuit (12C) for various INs in the system (100)), a configurable storage space option (e.g., a list of disk cloning technologies across one or more INs in the system (100)), a configurable storage input/output (I/O) option (e.g., a list of possible file system block sizes across all target file systems), a user type (e.g., a knowledge worker, a task worker with relatively low-end compute requirements, a high-end user that requires a rich multimedia experience, etc.), a network resource related template (e.g., a 10 GB/s BW with 20 ms latency quality of service (QOS) template), a DPU related template (e.g., a 1 GB/s BW vDPU with 1 GB vDPU frame buffer template), a GPU related template (e.g., a depth-first vGPU with 1 GB vGPU frame buffer template), a storage space related template (e.g., a 40 GB SSD storage template), a CPU related template (e.g., a 1 vCPU with 4 cores template), a memory resource related template (e.g., an 8 GB DRAM template), a vCPU count per analytics engine, a virtual NIC (vNIC) count per IN in the system (100), a wake on LAN support configuration (e.g., supported/enabled, not supported/disabled, etc.), a vGPU count per IN in the system (100), a type of a vGPU scheduling policy (e.g., a "fixed share" vGPU scheduling policy), a storage mode configuration (e.g., an enabled high-performance storage array mode), etc.

In one or more embodiments, as being telemetry data, a system log (e.g., a file that records system activities across hardware and/or software components of a client, an internal lifecycle controller log (which may be generated as a result of internal testing of a NIC), etc.) may include (or specify), for example (but not limited to): a type of an asset (e.g., a type of a workload such as an SQL database, a NAS executing on-premises, a VM executing on a multi-cloud infrastructure, etc.) that is utilized by a user; computing resource utilization data (or key performance metrics including estimates, measurements, etc.) (e.g., data related to a user's maximum, minimum, and average CPU utilizations, an amount of storage or memory resource utilized by a user, an amount of networking resource utilized by user to perform a network operation, etc.) regarding computing resources of a client (e.g., 110A); an alert that is triggered in a client (e.g., based on a failed cloud disaster recovery operation (which is initiated by a user), the client may generate a failure alert); an important keyword associated with a hardware component of a client (e.g., recommended maximum CPU operating temperature is 75° C.); a computing functionality of a microservice (e.g., Microservice A's CPU utilization is 26%, Microservice B's GPU utilization is 38%, etc.); an amount of storage or memory resource (e.g., stack memory, heap memory, cache memory, etc.) utilized by a microservice (e.g., executing on a client); a certain file operation performed by a microservice; an amount of networking resource utilized by a microservice to perform a network operation (e.g., to publish and coordinate inter-process communications); an amount of bare metal communications executed by a microservice (e.g., I/O operations executed by the microservice per second); a quantity of threads (e.g., a term indicating the quantity of operations that may be handled by a processor at once) utilized by a process that is executed by a microservice; an identifier of a client's manufacturer; media access control (MAC) information of a client; an amount of bare metal communication executed by a client (e.g., I/O operations executed by a client per second); etc.

In one or more embodiments, an alert (e.g., a predictive alert, a proactive alert, a technical alert, etc.) may be defined by a vendor of a corresponding client (e.g., 110A), by an administrator, by another entity, or any combination thereof. In one or more embodiments, an alert may specify, for example (but not limited to): a medium-level of CPU overheating is detected, a recommended maximum CPU operating temperature is exceeded, etc. Further, an alert may be defined based on a data protection policy.

In one or more embodiments, an important keyword may be defined by a vendor of a corresponding client (e.g., 110A), by a technical support specialist, by the administrator, by another entity, or any combination thereof. In one or more embodiments, an important keyword may be a specific technical term or a vendor specific term that is used in a system log.

In one or more embodiments, as being telemetry data, an application log may include (or specify), for example (but not limited to): a type of a file system (e.g., a new technology file system (NTFS), a resilient file system (ReFS), etc.); a product identifier of an application; a version of an OS that an application is executing on; a display resolution configuration of a client; a health status of an application (e.g., healthy, unhealthy, etc.); warnings and/or errors reported for an application; a language setting of an OS; a setting of an application (e.g., a current setting that is being applied to an application either by a user or by default, in which the setting may be a font option that is selected by the user, a background setting of the application, etc.); a version of an application; a warning reported for an application (e.g., unknown software exception (0xc00d) occurred in the application at location 0x0007d); a type of an OS (e.g., a workstation OS); an amount of storage used by an application; a size of an application (size (e.g., 5 Megabytes (5 MB), 5 GB, etc.) of an application may specify how much storage space is being consumed by that application); a type of an application (a type of an application may specify that, for example, the application is a support, deployment, or recycling application); a priority of an application (e.g., a priority class of an application, described below); active and inactive session counts; etc.

As used herein, "unhealthy" may refer to a compromised health state (e.g., an unhealthy state), indicating a corresponding entity (e.g., a hardware component, a client, an application, etc.) has already or is likely to, in the future, be no longer able to provide the services that the entity has previously provided. The health state determination may be made via any method based on the aggregated health information without departing from the scope of the embodiments disclosed herein.

In one or more embodiments, a priority class may be based on, for example (but not limited to): an application's tolerance for downtime, a size of an application, a relationship (e.g., a dependency) of an application to other applications, etc. Applications may be classified based on each application's tolerance for downtime. For example, based on the classification, an application may be assigned to one of three classes such as Class I, Class II, and Class III. A "Class I" application may be an application that cannot tolerate downtime. A "Class II" application may be an application that can tolerate a period of downtime (e.g., an hour or other period of time determined by an administrator or a user). A "Class III" application may be an application that can tolerate any amount of downtime.

In one or more embodiments, metadata (e.g., system logs, application logs, etc.) may be obtained (or dynamically fetched) as they become available (e.g., with no user manual intervention), or by the analyzer (e.g., 202, FIG. 2.1) polling a corresponding client (e.g., 110A) (by making schedule-driven/periodic application programming interface (API) calls to the client without affecting the client's ongoing production workloads) for newer metadata. Based on receiving the API calls from the analyzer, the client may allow the analyzer to obtain the metadata.

In one or more embodiments, the metadata may be obtained (or streamed) continuously as they generated, or they may be obtained in batches, for example, in scenarios where (i) the analyzer (e.g., 202, FIG. 2.1) receives a metadata analysis request (or a heath check request for a client), (ii) another IN of the system (100) accumulates the metadata and provides them to the analyzer at fixed time intervals, or (iii) the database (135) stores the metadata and notify the analyzer to access the metadata from the database. In one or more embodiments, metadata may be access-protected for a transmission from a corresponding client (e.g., 110A) to the analyzer (e.g., 202, FIG. 2.1), e.g., using encryption.

While the unstructured and/or structured data are illustrated as separate data structures and have been discussed as including a limited amount of specific information, any of the aforementioned data structures may be divided into any number of data structures, combined with any number of other data structures, and/or may include additional, less, and/or different information without departing from the scope of the embodiments disclosed herein.

Additionally, while illustrated as being stored in the database (135), any of the aforementioned data structures may be stored in different locations (e.g., in persistent storage of other computing devices) and/or spanned across any number of computing devices without departing from the scope of the embodiments disclosed herein.

In one or more embodiments, the unstructured and/or structured data may be updated (automatically) by third-party systems (e.g., platforms, marketplaces, etc.) (provided by vendors) and/or by the administrators based on, for example, newer (e.g., updated) versions of external information. The unstructured and/or structured data may also be updated when, for example (but not limited to): newer system logs are received, a state of the analyzer (e.g., 202, FIG. 2.1) is changed, etc.

While the database (135) has been illustrated and described as including a limited number and type of data, the database (135) may store additional, less, and/or different data without departing from the scope of the embodiments disclosed herein. One of ordinary skill will appreciate that the database (135) may perform other functionalities without departing from the scope of the embodiments disclosed herein.

While FIG. 1 shows a configuration of components, other system configurations may be used without departing from the scope of the embodiments disclosed herein.

Turning now to FIG. 2.1, FIG. 2.1 shows a diagram of an IN (200) in accordance with one or more embodiments disclosed herein. The IN (200) may be an example of the IN discussed above in reference to FIG. 1. The IN (200) includes the analyzer (202), the engine (204), and the visualizer (206). The IN (200) may include additional, fewer, and/or different components without departing from the scope of the embodiments disclosed herein. Each component may be operably connected to any of the other component via any combination of wired and/or wireless connections. Each component illustrated in FIG. 2.1 is discussed below.

In one or more embodiments, the analyzer (202) may include functionality to, e.g.,: (i) receive/obtain distributed metadata (e.g., distributed logs) coming from different clients to get a logical view of all logs relevant to process a specific request (e.g., received from an administrator); (ii) use parameters/details available in distributed logs in order to, at least, (a) trace a specific request through a distributed system (e.g., 100, FIG. 1), (b) identify potential errors (e.g., performance issues) occurred while processing the specific request (e.g., which application was down while processing the specific request, what caused that application to went down, etc.), (c) trace requests that display high-latency across all applications (e.g., microservices), (d) in conjunction with the engine (204), reduce mean time to troubleshooting performance issues, (e) in conjunction with the engine (204), get immediate root cause identification of every application impact, and (f) improve user experience by re-establishing end-to-end interoperability; (iii) based on (ii), infer dependencies and connectivity among applications executing on the system (e.g., which applications are working together, which ports are open, etc.); (iv) monitor performance (e.g., a health status) of a client (e.g., 110A, FIG. 1) by obtaining telemetry data (e.g., metadata, computing resource utilization data (or key performance metrics) of hardware and/or software components, etc.) associated with the client; (v) based on (iv) and for each hardware or software component (of the client), derive a continuous average resource utilization value with respect to each computing resource; (vi) based on (iv) and for each hardware or software component (of the client), derive minimum and maximum resource utilization values with respect to each computing resource; (vii) identify health of each component based on average, minimum, and maximum resource utilization values; (viii) based on (vii), automatically react and generate alerts if one of the predetermined maximum resource utilization value thresholds is exceeded; (ix) provide identified health of each component (and, indirectly, health of the client) and generated alerts (if any) to other entities (e.g., 204) in order to manage the health of the client; and/or (x) store monitored resource utilization data and generated alerts (if any) to the database (e.g., 135, FIG. 1) to generate a resource utilization map.

In one or more embodiments, while monitoring, the analyzer (202) may need to, for example (but not limited to): inventory one or more hardware and/or software components of a client (e.g., 110A, FIG. 1); obtain type and model information of each component of a client; obtain a version of firmware or other code executing on a component (e.g., a microservice (e.g., 212, FIG. 2.2)) of a client; obtain information specifying each component's interaction with one another in a client and/or with another component of a second client; etc.

In one or more embodiments, the analyzer (202) may derive minimum and maximum resource utilization values (with respect to each computing resource) as a reference to infer whether a continuous average resource utilization value (with respect to each computing resource) is derived properly. If there is an issue with the derived continuous average resource utilization value, based on the reference, the analyzer (202) may re-derive the continuous average resource utilization value.

In one or more embodiments, the resource utilization map may be implemented using one or more data structures that includes information regarding the utilization of computing resources (e.g., a hardware resource, a software resource, a CPU, memory, etc.) of the IN (200) and/or the client (e.g., 210A, FIG. 2.2). The resource utilization map may specify, for example (but not limited to): an identifier of a microservice (e.g., 212, FIG. 2.2), an identifier of a computing resource, an identifier of a resource that has been utilized by a microservice, etc.

The resource utilization map may specify the resource utilization by any means. For example, the resource utilization map may specify an amount of utilization, resource utilization rates over time, power consumption of applications/microservices while utilized by a user, workloads performed using microservices, etc. The resource utilization map may include other types of information used to quantify the utilization of resources by microservices without departing from the scope of the embodiments disclosed herein.

In one or more embodiments, the resource utilization map may be maintained by, for example, the analyzer (202). The analyzer (202) may add, remove, and/or modify information included in the resource utilization map to cause the information included in the resource utilization map to reflect the current utilization of the computing resources. Data structures of the resource utilization map may be implemented using, for example, lists, tables, unstructured data, structured data, etc. While described as being stored locally, the resource utilization map may be stored remotely and may be distributed across any number of devices without departing from the scope of the embodiments disclosed herein.

Further, the analyzer (202) may include functionality to, e.g.,: (i) obtain/retrieve a dataset (including, at least, images and videos) from the database (e.g., 135, FIG. 1); (ii) based on (i) and by employing a linear model, a non-linear model, and/or an ML model, analyze and annotate data included in the dataset to mark regions of, at least, a sensitive object (more specifically, to mark regions of an image of the sensitive object); (iii) based on (ii) and by employing a linear model, a non-linear model, and/or an ML model, clean the annotated data to obtain cleaned annotated data; and/or (iv) based on (iii), provide the cleaned annotated data to the engine (204).

One of ordinary skill will appreciate that the analyzer (202) may perform other functionalities without departing from the scope of the embodiments disclosed herein. The analyzer (202) may be implemented using hardware (e.g., a physical device including circuitry), software, or any combination thereof.

In one or more embodiments, the engine (204) may include functionality to, e.g.,: (i) upon receiving/obtaining cleaned annotated data from the analyzer (202), and by employing a linear model, a non-linear model, and/or an ML model, split the cleaned annotated data into training data and testing data; (ii) based on (i) and a target parameter, generate an object detection model by training a suitable model (e.g., an ML model) using the training data; (iii) evaluate the accuracy of the object detection model using the testing data; (iv) based on (iii), and by employing a linear model, a non-linear model, and/or an ML model, convert the object detection model into a microservice (e.g., 212, FIG. 2.2); (v) based on (iv), deploy the microservice to a corresponding client (e.g., 210A, FIG. 2.2); and/or (vi) based on (v) and using the visualizer (206), initiate notification of an administrator of the IN (200) about deployment of the microservice (to the client).

Further, the engine (204) may include functionality to, e.g.,: (i) in conjunction with the analyzer (202), provide a useful ML-based framework to the administrator to at least assist the administrator for accurately detecting one or more anomalies in, for example, system logs (of a client) and to increase the administrator's performance (in terms of taking actions to (a) remediate hardware/software component related issues (occurred in the client) faster and/or (b) prevent any future hardware/software component related issues that may occur on the client); (ii) in conjunction with the analyzer (202) and the visualizer (206), automate at least some of the "issue detection" tasks/duties assigned to the administrator for a better administrator experience; and/or (iii) in conjunction with the analyzer (202), analyze metadata (e.g., system logs, application logs, etc.) obtained from a client (a) to identify health (or health information) of each component of the client, (b) to tag/label each component as "healthy" or "unhealthy" for troubleshooting and optimization purposes (of the client), (c) to infer an overall health status of the client, and (d) to generate a device state path for the client (e.g., from a healthy device state to an unhealthy device state) (which may be useful for the administrator to infer how a hardware component failure has occurred (in the client) and to identify the various states that the client was in).

In one or more embodiments, the engine (204) may generate a device state chain (of a client) using a device state path (which corresponds to device states up to a current device state), a current device state, and a next device state of the client. As indicated, while generating the device state chain, not just the previous device state is considered, but the whole device state path is considered. For example, the engine (204) may generate a device state chain as A→B (where B is the current device state of a client) and B→C (where A represents "fan failure", B represents "overheating of CPU", and C represents "CPU failure"). In this example, the engine (204) (i) may calculate the probability of "A→B" in the device state chain as 0.2 and (ii) may calculate the probability of "B→C" in the device state chain as 0.3, where the probability of the device state chain "A→B→C" may be calculated as 0.06.

As discussed above, the engine (204) may infer a current device state of a device (e.g., a client) based on metadata (obtained from the client), in which the current device state may indicate a device state where a hardware component failure was reported. In one or more embodiments, the engine (204) may include a list of device states (associated with the client) where the client transitioned and, among the list of device states, a next device state may be the device state that has the highest probability to become the next device state.

In one or more embodiments, the engine (204) may initiate, for example, displaying of (i) identified/tagged health of a corresponding client, (ii) a holistic user profile of a user of the client, and/or (iii) analyzer generated alerts to an administrator via the visualizer (206) (e.g., via a GUI, an API, a programmatic interface, and/or a communication channel of the visualizer) to indicate an overall health status of the client. In one or more embodiments, for example, (i) each data item (e.g., identified health of the client, an analyzer generated alert, etc.) may be displayed (e.g., highlighted, visually indicated, etc.) with a different color (e.g., red color tones may represent a negative overall health status of the client, green color tones may represent a positive overall health status of the client, etc.), and (ii) one or more useful insights/recommendations with respect to the overall health status of the client may be displayed in a separate window(s) on the visualizer (206) to assist the administrator while managing the overall health status of the client (e.g., for a better administrator experience, to help the administrator with respect to understanding the benefits and tradeoffs of selecting different troubleshooting options, etc.).

Further, the visualizer (206) may include functionality to, e.g.,: (i) obtain (or receive) data (e.g., any type and/or quantity of input) from any source (e.g., a user via a client (e.g., 110A, FIG. 1), the engine (204), etc.) (and, if necessary, aggregate the data); (ii) based on (i) and by employing a set of linear, non-linear, and/or ML models, analyze, for example, a query to derive additional data; (iii) encompass hardware and/or software components and functionalities provided by the IN (200) to operate as a service over the network (e.g., 130, FIG. 1) so that the visualizer (206) may be used externally; (iv) employ a set of subroutine definitions, protocols, and/or hardware/software components for enabling/facilitating communications between, for example, the engine (204) and external entities (e.g., clients, administrators, etc.); (v) by generating one or more visual elements, allow an administrator to, at least, interact with a user of a corresponding client; (vi) receive a customer/user profile of a customer and display the customer profile to an administrator (e.g., for monitoring and/or performance evaluation); (vii) concurrently display one or more separate windows, for example, on its GUI; and/or (viii) generate visualizations of the method illustrated in FIG. 5.1.

One of ordinary skill will appreciate that the visualizer (206) may perform other functionalities without departing from the scope of the embodiments disclosed herein. The visualizer (206) may be implemented using hardware, software, or any combination thereof.

One of ordinary skill will appreciate that the engine (204) may perform other functionalities without departing from the scope of the embodiments disclosed herein. The engine (204) may be implemented using hardware, software, or any combination thereof.

In one or more embodiments, the analyzer (202), the engine (204), and the visualizer (206) may be utilized in isolation and/or in combination to provide the aforementioned functionalities. These functionalities may be invoked using any communication model including, for example, message passing, state sharing, memory sharing, etc.

Turning now to FIG. 2.2, FIG. 2.2 shows a diagram of a client (e.g., Client A (210A)) in accordance with one or more embodiments disclosed herein. Client A (210A) may be an example of a client discussed above in reference to FIG. 1. Client A (210A) includes the microservice (212) and the visual sensor (214). Client A (210A) may include additional, fewer, and/or different components without departing from the scope of the embodiments disclosed herein. Each component may be operably connected to any of the other component via any combination of wired and/or wireless connections. Each component illustrated in FIG. 2.2 is discussed below.

In one or more embodiments, a microservice architecture (also referred to herein as "a microservice") is a software approach in which a single application is composed of many loosely coupled and independently deployable smaller services. A microservice may allow a large application to be divided into smaller independent parts (with each part having its own responsibility), and may provide a framework to develop, deploy, and/or maintain services independently. In this type of application architecture, (i) each service may have its own (e.g., allocated) technology stack (e.g., RAM, memory, data management model, etc.) and (ii) each service may communicate with one another over a combination of APIs, message brokers, and/or event streaming.

In one or more embodiments, after being deployed to Client A (210A) and as an additional layer of security, the microservice (212) may include functionality to, e.g.,: (i) when a video call is being initiated (by a user) or when an executing video call application is detected, establish a connection with hardware components/peripherals (e.g., a camera (e.g., the visual sensor (214)), a microphone, an audio sensor, an electromagnetic radiation sensor, etc.) of Client A (210A); (ii) via the visual sensor (214), capture an initial snapshot (and/or a video feed) of an environment (that hosts Client A (210A)) for analysis; (iii) based on (ii) and by employing the object detection model (generated by the engine (e.g., 204, FIG. 2.1)), analyze the snapshot (and/or the feed) to infer that, at least, the visual sensor (214) is operational; (iv) based on (ii) and (iii), make a determination as to whether an image of a sensitive object/content is detected (in the snapshot and/or in the feed); (v) based on the determination, initiate notification of a user (of Client A (210A)) about the sensitive content; (vi) in response to the notification (in (v)), receive a preference from the user with respect to the sensitive content; (vii) based on the preference, protect the sensitive content by blurring or masking the image of the sensitive content; and/or (viii) based on (vii), await for the user to join the video call/meeting.

Further, the microservice (212) may include functionality to, e.g.,: (i) when the user joins the video call and via the visual sensor (214), monitor (in real-time) the environment of the user (the same environment that hosts Client A (210A)) to capture a real-time video feed (associated with the environment); (ii) based on (i) and by employing the object detection model, analyze the video feed; (iii) based on (ii), make a first determination as to whether a sensitive action is detected; (iv) based on the first determination, protect a sensitive object (resulting from the sensitive action) by blurring or masking an image of the sensitive object; (v) based on (iv), initiate notification of the user (of Client A (210A)) about the sensitive action and object; (vi) in response to the notification (in (v)), make a second determination as to whether the user requests removal of the blurring or masking of the sensitive object; (vii) based on the second determination, terminate protection of the sensitive object; and/or (viii) (periodically or on demand) communicate with the engine (e.g., 204, FIG. 2.1), at least, (a) to report an unidentified object and/or an unidentified user action, (b) to check for an update regarding the object detection model, and/or (c) to send an activities report (including, for example, a type of a sensitive action, a type of a blurred or masked sensitive object, a number of detected sensitive actions, a number of blurred or masked sensitive objects, etc.) to the engine.

In one or more embodiments, if the "trained (and/or fine-tuned)" object detection model is not operating properly (e.g., is not providing the functionalities discussed in this application because of unidentified objects detected in the corresponding environment), the model may be re-trained using any form of training data and/or the model may be updated periodically as there are improvements in the model (e.g., the model may be trained using more appropriate training data and may be tested using more appropriate testing data).

As described above, to provide a desirable quality of user experience, the microservice (212) may utilize information obtained using the visual sensor (214), information obtained using other sensors of Client A (210A), and/or other types of information (e.g., raw data) to make a decision regarding how to react to sensitive actions and/or sensitive objects. For example, the microservice (212) may use information obtained using the visual sensor (214) and/or other sensors to determine when to blur or mask an image of a sensitive object.

In another example, the microservice (212) may use information obtained using the visual sensor (214) and/or other sensors to determine how to operate the visual sensor (214) and/or other hardware components of Client A (210A), where (based on compliance related parameters and/or user-defined security policies (e.g., user-defined threat detection and mitigation policies)) the microservice (212) may modify the settings and/or firmware of the visual sensor (214) and/or other sensors to modify the operation of these hardware and/or software components.

In one or more embodiments, the microservice (212) may comply with regulations/acts/standards (or compliance related parameters) and/or user-defined security policies to manage a corresponding user's data security and privacy (e.g., based on a compliance related parameter, masking an image of a sensitive object before a video call is being initiated; based on a user-defined security policy, blurring an image of a sensitive object during an ongoing video call, etc.).

The compliance related parameters and user-defined security policies (e.g., security preferences of a user) may be maintained by the microservice (212). The microservice (212) may add, remove, and/or modify information included in, for example, a compliance related parameter to cause the information to reflect the latest condition/state of a user. The compliance related parameters and user-defined security policies may be implemented using, for example, lists, tables, unstructured data, structured data, etc. While described as being stored locally (in a storage device of Client A (210A)), the compliance related parameters and user-defined security policies may be stored remotely (e.g., in the database (e.g., 135, FIG. 1)) and may be distributed across any number of devices without departing from the scope of the embodiments disclosed herein.

In one or more embodiments, a compliance related parameter may include (or specify), for example (but not limited to): a General Data Protection Regulation (GDPR) compliance requirement (e.g., different "types" personal data may require different levels of protection, for example, sensitive data (e.g., health data, biometrics data, genetic data, criminal history data, etc.) may be subject to the highest levels of data protection; organizations may get consent (from users or data subjects) to collect personal data (with the level of consent varying according to the type of personal data being collected); an organization that collects personal data for a targeted purpose may not use the collected data for another purpose (such as consumer profiling, which may be considered "non-compliant"); data subjects (i.e., the data subjects whose personal data is being collected) may be able to understand why their data is being collected and how it is being processed, and they may have the right to object, correct, and/or remove the data; etc.); a Sarbanes-Oxley Act (SOX) compliance requirement (e.g., prevent data tampering and monitor for breaches, document activity timelines and encrypt the data, install access tracking controls that may identify breaches, check constantly to ensure defense systems are working, analyze security system data (and improve when needed), implement real-time security breach tracking, grant auditors defense system access for complete transparency, disclose security incidents to auditors for a quick response, report technical difficulties to auditors and avoid stalls, etc.); a Health Insurance Portability and Accountability (HIPAA) compliance requirement (e.g., ensure the confidentiality, integrity, and availability of all protected health information (PHI) in any form (e.g., electronic, paper, oral, etc.); identify and protect against reasonably anticipated security threats; protect against reasonably anticipated, impermissible uses or disclosures; ensure compliance of workforce and business associates; etc.); a Payment Card Industry Data Security Standard (PCI DSS) compliance requirement (unlike HIPAA and GDPR requirements, which are based on governmental regulation(s), PCI DSS compliance requirements are contractual commitments maintained and enforced by the Payment Card Industry Security Standards Council) (e.g., build and maintain a secure network and system; protect cardholder data; maintain a vulnerability management program (e.g., quarterly vulnerability scans, annuals assessments, etc.); implement strong access control measures; regularly monitor and test networks; maintain an information security policy; etc.); a California Consumer Privacy Act (CCPA) compliance requirement (e.g., users may have the right to know what personal data is collected or sold (and for what purpose); users may have access to personal data, to request its deletion, and/or to opt-out being collected or sold; users may have the right to sue companies for data breaches and for privacy failures; etc.); a Personal Information Protection and Electronic Documents Act (PIPEDA) compliance requirement (e.g., an organization may need to obtain its users' consent prior to data collection; an organization may need to uphold transparent personal data policies, and limit data collection to clear and specific purposes; users may need to have the right to access their data and to challenge its accuracy; organizations may be held accountable for data loss or theft; organizations may need to disclose security breaches of personal data to individuals who affected by the breach; etc.); etc.

In one or more embodiments, a user-defined security policy may include information regarding how a user of Client A (210A) desires the microservice (212) to operate. A user-defined security policy may specify, for example (but not limited to): when the microservice (212) needs to wake up (e.g., upon detection of a user's face via the visual sensor (214), every business day for a specific period of time (where the user will be using Client A (210A)), etc.); whether or not an image of a sensitive object should be automatically blurred or masked before joining a video call and/or during an ongoing video call; what the microservice (212) needs to do when the visual sensor (214) indicates absence of the user; what the microservice (212) needs to do when the user is joining a video call from a public environment (e.g., an environment where the user is more concerned about the security and privacy his/her personal data); when the user is joining a video call from a public environment, the microservice (212) should limit activity of the visual sensor (214) and/or other hardware components (including other sensors) of Client A (210A) (e.g., the microservice (212) should disable use of the visual sensor (214) when the visual sensor is unlikely to be able to detect the presence of the user); etc.

One of ordinary skill will appreciate that the microservice (212) may perform other functionalities without departing from the scope of the embodiments disclosed herein. The microservice (212) may be implemented using hardware, software, or any combination thereof. In one or more embodiments, the microservice (212) may be configured to perform all, or a portion, of the functionalities described in FIGS. 5.2 and 5.3.

In one or more embodiments, the visual sensor (214) is implemented as a physical device. The visual sensor (214) may include a charge-coupled device or other type of sensor that is able to generate digital images of an environment (e.g., a public environment, a private/home environment, etc.) proximate to Client A (210A). As described above in reference to FIG. 1, the hardware components of a client may be operably connected to each other using any interconnection technology. For example, the visual sensor (214) and other hardware components/devices not illustrated in FIG. 2.2 may be interconnected via one or more data buses. The data buses may implement any number and type of communication protocols.

In one or more embodiments, the visual sensor (214) may capture a snapshot of the environment (that hosts Client A (210A)), in which the snapshot may be a viewable/maximum area (of the environment) that can be imaged by the visual sensor (214). As used herein, a maximum area that can be imaged (by the visual sensor (214)) may refer to a "field of view (FOV)" of the visual sensor (214). The FOV of the visual sensor (214) may be related to the focal length of the visual sensor's lens and the size of the visual sensor (e.g., the sensor size), in which (i) the sensor size is determined by the number of pixels on the visual sensor and the size of the pixels, and (ii) the focal length of the lens indicates the distance between the lens and a focused image on the visual sensor. In one or more embodiments, the microservice (212) may use the visual sensor (214) for obtaining information (which may be stored as raw data in a storage device of Client A (210A)) regarding the environment surrounding Client A (210A), where the information may be a data structure reflecting an image captured by the visual sensor (214). To manage the visual sensor (214) (e.g., in light of a compliance related parameter and/or a user-defined security policy), the microservice (212) may have access to camera management data. In one or more embodiments, the camera management data may be implemented using one or more data structures that include information regarding how a visual sensor (or a camera) is to operate and/or actions that are to be performed in response to information obtained from the camera.

For example, the camera management data may include information-action relationships (e.g., compliance related parameters, user-defined security policies, etc.) that specify actions to be performed by the microservice (212) in response to data obtained from the visual sensor (214). The information-action relationships may specify, for example (but not limited to): a corresponding user of Client A (210A) needs to be notified when a second user is detected in a captured image; a duration of time during which the microservice (212) should continue to analyze raw data (or image data) to attempt to detect the presence of the user; a condition where the microservice (212) should enable or disable the visual sensor (214); etc. In addition to the information-action relationships, the camera management data may also include settings for operation of the visual sensor (214) and/or firmware for the visual sensor (214).

In one or more embodiments, the camera management data may be updated dynamically by a vendor of the visual sensor (214). For example, the vendor may provide updates of the camera management data to the microservice (212). Once updated, the microservice (212) may manage the operation of the visual sensor (214) in accordance with the camera management data.

In one or more embodiment, the raw data may be implemented using one or more data structures that include information obtained from the visual sensor (214) and/or other sensor of Client A (210A). For example, the raw data may include (i) one or more images generated by the visual sensor (214) and (ii) a video feed captured by the visual sensor (214).

One of ordinary skill will appreciate that the visual sensor (214) may perform other functionalities without departing from the scope of the embodiments disclosed herein.

Figure 3:
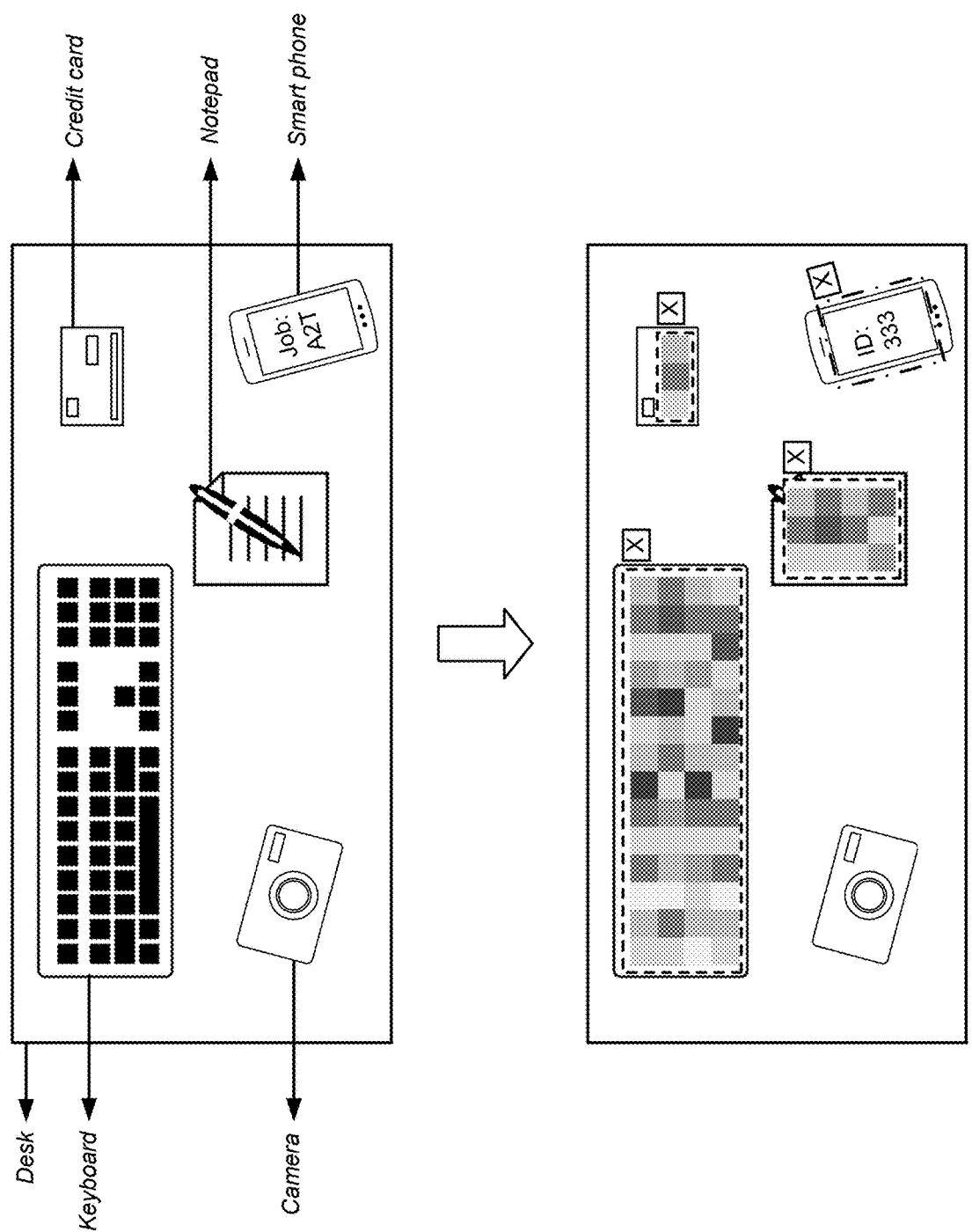
FIG. 3 shows an example use case in which images of sensitive objects are blurred or masked in accordance with one or more embodiments disclosed herein.

Turning now to FIG. 3, FIG. 3 shows an example use case in which images of sensitive objects are blurred or masked in accordance with one or more embodiments disclosed herein.

Assume here that User A is using Client B to initiate (and join) a video call (from a private environment), in which Client B hosts at least a microservice (e.g., 212, FIG. 2.2) and a visual sensor (e.g., 214, FIG. 2.2). When the video call is being initiated (but before User A joins the call), the visual sensor captures an initial snapshot of the environment, in which the snapshot includes an image of a desk, an image of a keyboard, an image of a camera, an image of a credit card, an image of a notepad, and an image of a smart phone.

Based on the aforementioned images, the microservice determines that: (i) the environment includes at least the desk, keyboard, camera, credit card, notepad, and smart phone, (ii) the keyboard, camera, credit card, notepad, and smart phone are located on top of the desk, (iii) the keyboard is a sensitive object because User A may enter a username and/or a password via the keyboard during the call, (iv) the camera is not a sensitive object, (v) the credit card is a sensitive object because the credit card includes personal information of User A, (vi) the notepad is a sensitive object because the notepad includes mission critical information, and (vii) the smart phone is a sensitive object because User A may receive a personal information included notification during the call.

Thereafter, based on the aforementioned determinations, the microservice (irrespective of which users will join the call): (i) automatically blurs at least a part of the image of the keyboard, (ii) automatically blurs at least a part of the image of the credit card (e.g., the part that includes User A's personal/identity information), (iii) automatically blurs at least a part of the image of the notepad (e.g., the part that includes the mission critical information), (iv) automatically masks at least a part of the image of the smart phone (e.g., the part that includes the display of the smart phone) by replacing information shown on the display with fake information (e.g., "ID:333") (where another user on the call will not be aware that the information is replaced with the fake information), and (v) provides an option for each of the blurred or masked images to User A, where User A can conveniently remove blurring or masking of a corresponding image by clicking on the "X" button/icon of the image (if User A decides that the image is no longer sensitive for sharing/displaying (or the image no longer include personal information of User A)). After performing the aforementioned "blurring or masking" steps, the microservice awaits for User A to join the video call.

Turning now to FIG. 4.1, FIG. 4.1 shows example pseudocode for a microservice (e.g., 212, FIG. 2.2) to establish a connection with a camera (e.g., 214, FIG. 2.2) of a client in accordance with one or more embodiments disclosed herein. As indicated in FIG. 4.1, after being deployed/installed to the client, the microservice establishes a connection with the camera and command/manage the camera before, during, and after a corresponding video call.

More specifically, the microservice may (i) import necessary libraries (e.g., from a storage device of the client), (ii) initialize the camera connection, (iii) define one or more parameters for the camera (e.g., setting the resolution for the camera, setting the frame rate for the camera, etc.), (iv) check whether or not the camera connection is successful, (v) based on the camera's FOV, capture a photo/snapshot of an environment (that surrounds the client), (vi) based on the camera's FOV, capture/record a video of the environment, and/or (vii) release the camera when the video call/conferencing is finished.

Turning now to FIG. 4.2, FIG. 4.2 shows example pseudocode to identify whether or not one or more video conferencing applications are executing on the client in accordance with one or more embodiments disclosed herein. As indicated in FIG. 4.2, after being deployed/installed to the client, the microservice may start operating when an executing video call application is detected on the client.

On the other hand, the microservice may (i) be initiated (e.g., by a user of the client), (ii) check whether or not any of the video call applications are executing on the client, (iii) based on (ii), start its operation, (iv) continuously check whether or not the corresponding video call application is still executing on the client, and/or (v) be terminated when the video call application has stopped.

Turning now to FIG. 4.3, FIG. 4.3 shows example pseudocode for real-time object identification in the video call in accordance with one or more embodiments disclosed herein. As indicated in FIG. 4.3, after the user joins the video call, the microservice may start real-time monitoring and identification of sensitive actions (performed by the user) and sensitive objects (existing in the environment or resulting from the sensitive actions).

More specifically, the microservice may (i) import necessary libraries (e.g., from a storage device of the client), (ii) initialize capturing of a video feed/stream, (iii) load the "pre-trained" object detection model, (iv) process each frame/image in the video feed (where the object detection model is employed to identify one or more objects in the environment), (v) based on (iv), process the detected objects (e.g., at least a part of the image of a sensitive object is blurred or masked, the image of a non-sensitive object is not blurred or masked, etc.), (vi) display one or more processed frames (in the video call) to the user (via a GUI of the client), and/or (vii) release/terminate the video stream (e.g., when the user disables the camera of the client).

Turning now to FIG. 4.4, FIG. 4.4 shows example pseudocode for alerting the user for corrective actions in accordance with one or more embodiments disclosed herein. As indicated in FIG. 4.4, when a sensitive object and/or a sensitive action are detected before the video call or during the video call, the microservice may alert the user for taking corrective actions (or the microservice may (automatically) take one or more corrective actions to protect the user's security and privacy in terms of his/her personal data).

More specifically, the microservice may (i) define a function to alert the user, (ii) perform one or more operations to obtain output, (iii) check whether or not a corrective action is required based on the output, and/or (iv) based on (iii), initiate alerting the user or take the corrective action automatically.

FIG. 5.1 shows a method for generating an object detection model and converting the model into a microservice (e.g., 212, FIG. 2.2) in accordance with one or more embodiments disclosed herein. While various steps in the method are presented and described sequentially, those skilled in the art will appreciate that some or all of the steps may be executed in different orders, may be combined or omitted, and some or all steps may be executed in parallel without departing from the scope of the embodiments disclosed herein.

Turning now to FIG. 5.1, the method shown in FIG. 5.1 may be executed by, for example, the above-discussed analyzer (e.g., 202, FIG. 2.1), engine (e.g., 204, FIG. 2.1), and visualizer (e.g., 206, FIG. 2.1). Other components of the system (100) illustrated in FIG. 1 may also execute all or part of the method shown in FIG. 5.1 without departing from the scope of the embodiments disclosed herein.

In Step 500, the analyzer receives a request from a requesting entity (e.g., an administrator of the IN (e.g., 200, FIG. 2.1), an administrator terminal, an application, etc.) that wants to generate a microservice that, at least, detects sensitive objects (and/or sensitive actions) and blurs or masks images of those sensitive objects to protect user data security and privacy.

In response to receiving the request, as part of that request, and/or in any other manner (e.g., before initiating any computation with respect to the request), the analyzer invokes the database (e.g., 135, FIG. 1) to communicate with the database. After receiving the database's confirmation, the analyzer obtains a dataset (including at least images and videos that would reflect a user's daily life and activities) from the database. In one or more embodiments, the dataset may be obtained continuously or at regular intervals (e.g., every 5 hours) (without affecting production workloads of the database and the analyzer). Further, the dataset may be access-protected for the transmission from, for example, the database to the analyzer, e.g., using encryption.

In one or more embodiments, the dataset may be obtained as it becomes available or by the analyzer polling the database (via one or more API calls) for newer information. For example, based on receiving an API call from the analyzer, the database may allow the analyzer to obtain newer information.

In Step 502, by employing a set of linear, non-linear, and/or ML models, the analyzer analyzes the dataset (i) to annotate data (included in the dataset) and (ii) to mark regions of sensitive objects (e.g., a credit card, a notepad, a display of a laptop, a keyboard, a display of a smart phone, a physical key, etc.) included in the data. As a result of this "data annotation/labelling" process (which is performed to train and/or fine-tune a suitable ML model (see Step 508)), the analyzer may obtain annotated data. In one or more embodiments, the analyzer may store (temporarily or permanently) the annotated data to the database.

In Step 504, by employing a set of linear, non-linear, and/or ML models, the analyzer cleans the annotated data (obtained in Step 502) to obtain cleaned annotated data. In one or more embodiments, cleaning the annotated data may include identifying and removing consecutive or useless images and/or videos from the annotated data. Thereafter, the analyzer provides the cleaned annotated data to the engine.

In Step 506, upon receiving the cleaned annotated data from the analyzer, and by employing a set of linear, non-linear, and/or ML models, the engine splits the cleaned annotated data into training data and testing data. As a non-limiting example, the engine may split the cleaned annotated data as 60% training data and 40% testing data.

In Step 508, based on a target parameter (e.g., detecting images of sensitive objects in an environment and blurring or masking those images), the engine generates the object detection model (e.g., an ML or artificial intelligence (AI) model) by training a suitable ML/AI model (e.g., a convolutional neural network model, a "you only look once (YOLO)" object detection model, etc.) using the training data. Thereafter, the engine evaluates the accuracy of the object detection model and fine-tunes the "pre-trained" model using the testing data (to increase the accuracy of the model in terms of (i) sensitive object and sensitive action detection/recognition and (ii) taking necessary corrective actions/measures regarding the detected sensitive objects and sensitive actions (e.g., blurring an image of a sensitive object, masking an image of a sensitive object, sending an alert to a corresponding user for taking necessary measures, providing preventive guidance to the user for the future, etc.)). During the fine-tuning process, the "pre-trained" object detection model learns to better recognize specific actions, objects, and/or features marked as "sensitive" in the testing data.

In one or more embodiments, before generating the object detection model, the engine may obtain one or more model parameters (from the database) that provide instructions on how to detect a sensitive object and/or a sensitive action. The model parameters may also specify one or more ML models, including (but not limited to): a random forest regression model a neural network model, a logistic regression model, the K-nearest neighbor model, the extreme gradient boosting (XGBoost model), a Naïve Bayes classification model, a support vector machines (SVM) model, etc.

In one or more embodiments, the object detection model may be adapted to execute specific determinations described herein with reference to any component of the system (e.g., 100, FIG. 1) and processing operations executed thereby.

In one or more embodiments, as the object detection model is a learning model, accuracy of the model may be improved over time through iterations of training (and/or fine-tuning), receipt of user feedbacks, etc. Further, training (and/or fine-tuning) the object detection model may include application of a training algorithm. As an example, a decision tree (e.g., a Gradient Boosting Decision Tree) may be used to train the object detection model. In doing so, one or more types of decision tree algorithms may be applied for generating any number of decision trees to fine-tune the object detection model. In one or more embodiments, training of the object detection model may further include generating an ML/AI model that is tuned to reflect specific metrics for accuracy, precision and/or recall before the trained ML/AI model is exposed for real-time (or near real-time) usage (see FIGS. 5.2 and 5.3).

In Step 510, by employing a linear model, a non-linear model, and/or an ML model, the engine converts the object detection model into the microservice. In Step 512, the engine deploys the microservice to a corresponding client (e.g., 210A, FIG. 2.2) for real-time usage.

In Step 514, after deploying the microservice to the client (in Step 512), the engine initiates notification of an administrator/user (of the IN) about the deployment of the microservice (to the client) (and the generated object detection model). The notification may include, for example (but not limited to): for what purpose the model has been trained (and fine-tuned), the type of data that has been taken into account while training (and fine-tuning) the model, the amount of time that has been spent while performing the training (and fine-tuning) process, etc.

In one or more embodiments, the notification may also indicate whether the training (and fine-tuning) process was completed within the predetermined window, or whether the process was completed after exceeding the predetermined window. The notification may be displayed on the visualizer of the IN. In one or more embodiments, the method may end following Step 514.

FIG. 5.2 shows a method for performing an initial check of an environment (that surrounds the client) in accordance with one or more embodiments disclosed herein. While various steps in the method are presented and described sequentially, those skilled in the art will appreciate that some or all of the steps may be executed in different orders, may be combined or omitted, and some or all steps may be executed in parallel without departing from the scope of the embodiments disclosed herein.

Turning now to FIG. 5.2, the method shown in FIG. 5.2 may be executed by, for example, the above-discussed microservice. Other components of the system (100) illustrated in FIG. 1 may also execute all or part of the method shown in FIG. 5.2 without departing from the scope of the embodiments disclosed herein. In one or more embodiments, the method shown in FIG. 5.2 may be executed when a video call is being initiated (e.g., by the user of the client) or when an executing video call application is detected (on the client) by the microservice.

In Step 516, after being deployed to the client (see Step 512 of FIG. 5.1) and as an additional layer of security, the microservice establishes a connection with hardware peripherals/components (e.g., a camera (e.g., 214, FIG. 2.2), a microphone, an audio sensor, an electromagnetic radiation sensor, etc.) of the client to make sure that those hardware components are operable.

In Step 518, via the camera (or the visual sensor), the microservice captures an initial snapshot (and/or a video feed) of the environment for analysis, in which the snapshot may be a viewable/maximum area (of the environment) that can be imaged by the camera. In Step 520, by employing the object detection model (generated in Step 508 of FIG. 5.1), the microservice analyzes the snapshot (and/or the feed) to infer that, at least, the camera is operational.

In Step 522, based on Step 520 and by employing the object detection model, the microservice makes a determination (in real-time or near real-time) as to whether an image of a sensitive object/content (e.g., a physical key hanging on a wall, a credit card, a display of a smart phone, a display of a laptop, a notepad, a keyboard, etc.) is detected (in the snapshot and/or in the feed). Accordingly, in one or more embodiments, if the result of the determination is NO, the method proceeds to Step 530. If the result of the determination is YES, the method alternatively proceeds to Step 524.

In Step 524, as a result of the determination in Step 522 being YES, the microservice initiates notification of the user (of the client) about the detected sensitive content. The notification may include, for example (but not limited to): the number of detected sensitive objects, corrective actions (e.g., blurring an image of a sensitive object, masking an image of a sensitive object, keeping sensitive/personal objects away from the FOV of the camera, etc.) that needs to be applied before the user joins the video call, etc. The notification may be displayed on the GUI of the client.

In Step 526, in response to the notification (sent in Step 524), the microservice receives a preference from the user with respect to the detected sensitive content (or detected sensitive objects). In one or more embodiments, based on the preference, the method proceeds to Step 528 (preference: "take an action") or to Step 530 (preference: "take no action").

In Step 528, based on the preference of the user, the microservice protects the detected sensitive content by blurring or masking the image of the content (e.g., to prevent user data compromise/breach). For example, the microservice may blur at least a part of an image of a credit card (e.g., the part that includes the user's personal information) (see FIG. 3). As yet another example, the microservice may mask at least a part of an image of a smart phone (e.g., the part that includes the display of the smart phone) by replacing information shown on the display with fake information (where another user on the call will not be aware that the information is replaced with the fake information).

In Step 530, as a result of the determination in Step 522 being NO or based on the preference of the user, the microservice awaits for the user to join the video call/meeting. In one or more embodiments, the method may end following Step 530.

FIG. 5.3 shows a method for real-time monitoring and identification of sensitive actions (and sensitive objects) in the environment (that surrounds the client) in accordance with one or more embodiments disclosed herein. While various steps in the method are presented and described sequentially, those skilled in the art will appreciate that some or all of the steps may be executed in different orders, may be combined or omitted, and some or all steps may be executed in parallel without departing from the scope of the embodiments disclosed herein.

Turning now to FIG. 5.3, the method shown in FIG. 5.3 may be executed by, for example, the above-discussed microservice. Other components of the system (100) illustrated in FIG. 1 may also execute all or part of the method shown in FIG. 5.3 without departing from the scope of the embodiments disclosed herein. In one or more embodiments, the method shown in FIG. 5.3 may be executed when the user joins the video call. If the video call application restricts the user to join/attend the call from a public environment (that operates based on a public network), the microservice may automatically connect to a desired private network (from available networks) to overcome this restriction.

In Step 532, the microservice monitors the environment of the user (e.g., a private environment or a home environment, a public environment (where the client may be exposed to a public network), etc.) to continuously capture real-time video feed associated with the environment. In Step 534, by employing the object detection model, the microservice analyzes the video feed (i) to detect sensitive actions performed by the user (and/or to detect sensitive objects resulting from the sensitive actions), (ii) to identify a type of the environment (e.g., a public environment, a private environment, etc.), and (iii) to obtain an analyzed video feed.

In Step 536, based on Step 534 and by employing the object detection model, the microservice makes a first determination (in real-time or near real-time) as to whether a sensitive action (e.g., a change in a body posture of the user, an addition of a sensitive object to the FOV of the camera, an appearance of a private notification/message on a sensitive object's' display, etc.) and/or a sensitive object resulting from the sensitive action are detected (in the feed). Accordingly, in one or more embodiments, if the result of the first determination is NO, the method returns to Step 532. If the result of the first determination is YES, the method alternatively proceeds to Step 538.

In one or more embodiments, the user may change his/her body posture to, for example (but not limited to): read a notification from a smart phone, type a message using the client's keyboard, enter a password on the smart phone, etc.

In Step 538, as a result of the first determination in Step 536 being YES, the microservice protects the detected sensitive content/objects (resulting from the sensitive action) by blurring or masking an image of the content (e.g., to prevent user data compromise). For example, the microservice may blur at least a part of an image of a keyboard that the user is using to enter a password (see FIG. 3). As yet another example, the microservice may mask at least a part of an image of a smart phone (e.g., the part that includes the display of the smart phone) by replacing a personal message shown on the display with a fake notification (where another user on the call will not be aware that the personal message is replaced with the fake information).

In Step 540, based on Step 538, the microservice initiates notification of the user (of the client) about the detected sensitive action and the resulting sensitive content. The notification may include, for example (but not limited to): the number of detected sensitive actions, the number of detected sensitive objects, corrective actions (e.g., blurring an image of a sensitive object, masking an image of a sensitive object, etc.) that are performed during the video call, security policies applied by the video call application being used (e.g., the restrictions that have been experienced (by the microservice) to take a snapshot during the call, to manage video call settings of the application, etc.), other corrective actions that need to be taken (but could not be taken because of user-defined security policies (e.g., the user has restricted the microservice to blur or mask an image of a notepad during the call, but the notepad is a sensitive object and the image of the notepad needs to be blurred or masked)), etc. The notification may be displayed on the GUI of the client.

In Step 542, in response to the notification (sent in Step 540), the microservice makes a second determination (in real-time or near real-time) as to whether the user requests removal of blurring or masking of the image of the sensitive content (protected in Step 538). Accordingly, in one or more embodiments, if the result of the second determination is NO, the method proceeds to Step 546. If the result of the second determination is YES, the method alternatively proceeds to Step 544.

In Step 544, as a result of the second determination in Step 542 being YES, the microservice terminates protection of the sensitive content. Further, based on the user's response in Step 542 (where the user wants to comply with the user-defined security policies), the microservice may not take any corrective action with respect to the notepad (e.g., blurring or masking the image of the notepad).

In Step 546, as a result of the second determination in Step 542 being NO or after Step 544, the microservice makes a third determination (in real-time or near real-time) as to whether the video call is ended (e.g., by the user). Accordingly, in one or more embodiments, if the result of the third determination is NO, the method returns to Step 532. If the result of the third determination is YES, the method alternatively ends (where the microservice releases the camera).

Turning now to FIG. 6, FIG. 6 shows a diagram of a computing device in accordance with one or more embodiments disclosed herein.

In one or more embodiments disclosed herein, the computing device (600) may include one or more computer processors (602), non-persistent storage (604) (e.g., volatile memory, such as RAM, cache memory), persistent storage (606) (e.g., a non-transitory computer readable medium, a hard disk, an optical drive such as a CD drive or a DVD drive, a Flash memory, etc.), a communication interface (612) (e.g., Bluetooth interface, infrared interface, network interface, optical interface, etc.), an input device(s) (610), an output device(s) (608), and numerous other elements (not shown) and functionalities. Each of these components is described below.

In one or more embodiments, the computer processor(s) (602) may be an integrated circuit for processing instructions. For example, the computer processor(s) (602) may be one or more cores or micro-cores of a processor. The computing device (600) may also include one or more input devices (610), such as a touchscreen, keyboard, mouse, microphone, touchpad, electronic pen, or any other type of input device. Further, the communication interface (612) may include an integrated circuit for connecting the computing device (600) to a network (e.g., a LAN, a WAN, Internet, mobile network, etc.) and/or to another device, such as another computing device.

In one or more embodiments, the computing device (600) may include one or more output devices (608), such as a screen (e.g., a liquid crystal display (LCD), plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (602), non-persistent storage (604), and persistent storage (606). Many different types of computing devices exist, and the aforementioned input and output device(s) may take other forms.

The problems discussed throughout this application should be understood as being examples of problems solved by embodiments described herein, and the various embodiments should not be limited to solving the same/similar problems. The disclosed embodiments are broadly applicable to address a range of problems beyond those discussed herein.

One or more embodiments disclosed herein may be implemented using instructions executed by one or more processors of a computing device. Further, such instructions may correspond to computer readable instructions that are stored on one or more non-transitory computer readable mediums.

While embodiments discussed herein have been described with respect to a limited number of embodiments, those skilled in the art, having the benefit of this Detailed Description, will appreciate that other embodiments can be devised which do not depart from the scope of embodiments as disclosed herein. Accordingly, the scope of embodiments described herein should be limited only by the attached claims.

What is claimed is:

1. A method for managing security of a user, the method comprising:
   analyzing a dataset to annotate data, wherein the data is annotated to mark a region of a sensitive object (SO) and to obtain annotated data;
   cleaning the annotated data to obtain cleaned annotated data, wherein at least training data is generated from the cleaned annotated data;
   generating, based on a target parameter, an object detection model by training a model using at least the training data;
   converting the object detection model into a microservice, wherein the microservice is deployed to a client used by the user;
   after the microservice is deployed to the client:
      establishing a connection with a set of hardware peripherals of the client, wherein the set of hardware peripherals comprises at least a visual sensor;
      capturing, via the visual sensor, a snapshot of an environment that hosts the client, wherein the snapshot is a viewable area of the environment that can be imaged by the visual sensor;
      making, based on the snapshot, a first determination that an image of a second SO (SSO) is detected in the environment, wherein the user is notified about the SSO;
      receiving, in response to notifying the user, a preference about the SSO from the user;
      protecting, based on the preference, the SSO by blurring or masking the image;
      making, after protecting the SSO, a second determination that the user joins a call;
      monitoring, based on the second determination, the environment to capture a real-time video feed, wherein the video feed is analyzed to obtain an analyzed video feed (AVF);
      making, based on the AVF, a third determination that a sensitive action is detected;
      protecting, based on the third determination, a third SO (TSO) resulting from the sensitive action by blurring or masking a second image of the TSO, wherein the user is notified about the sensitive action and the TSO;
      making, in response to notifying the user, a fourth determination that the user requests removal of the blurring or the masking of the second image; and
      terminating, based on the fourth determination, protection of the TSO.

2. The method of claim 1, wherein the environment is a public environment or a private environment.

3. The method of claim 1, wherein the SSO is a credit card, wherein at least a part of a third image of the credit card is blurred to hide personal information of the user from a second user in the call.

4. The method of claim 1, wherein the SSO is a notepad, wherein at least a part of a third image of the notepad is masked to hide mission critical information from a second user in the call, wherein the third image of the notepad is masked by replacing the mission critical information with fake information.

5. The method of claim 1, wherein the sensitive action is a change in a body posture of the user, wherein the user changes the body posture to read a notification from a smart phone.

6. The method of claim 1, wherein the preference is a security preference that is determined by the user based on a threat detection and mitigation policy.

7. The method of claim 1, wherein the TSO is at least one selected from a group consisting of a credit card, a display of a smart phone, a display of a laptop, a notepad, and a keyboard.

8. The method of claim 1, wherein the target parameter specifies detecting images of SOs in a second environment that hosts a second user's client.

9. The method of claim 1, wherein the set of hardware peripherals further comprises a microphone, an audio sensor, and an electromagnetic radiation sensor.

10. A method for managing security of a user, the method comprising:
   establishing a connection with a set of hardware peripherals of a client, wherein the set of hardware peripherals comprises at least a visual sensor;
   capturing, via the visual sensor, a snapshot of an environment that hosts the client, wherein the snapshot is a viewable area of the environment that can be imaged by the visual sensor;
   making, based on the snapshot, a first determination that an image of a sensitive object (SO) is detected in the environment, wherein the user is notified about the SO;
   receiving, in response to notifying the user, a preference about the SO from the user;
   protecting, based on the preference, the SO by blurring or masking the image;
   making, after protecting the SO, a second determination that the user joins a call;
   monitoring, based on the second determination, the environment to capture a real-time video feed, wherein the video feed is analyzed to obtain an analyzed video feed (AVF);
   making, based on the AVF, a third determination that a sensitive action is detected;
   protecting, based on the third determination, a second SO (SSO) resulting from the sensitive action by blurring or masking a second image of the SSO, wherein the user is notified about the sensitive action and the SSO;

making, in response to notifying the user, a fourth determination that the user requests removal of the blurring or the masking of the second image; and terminating, based on the fourth determination, protection of the SSO.

11. The method of claim 10, further comprising:

prior to establishing the connection:

analyzing a dataset to annotate data, wherein the data is annotated to mark a region of a third SO (TSO) and to obtain annotated data;

cleaning the annotated data to obtain cleaned annotated data, wherein at least training data is generated from the cleaned annotated data;

generating, based on a target parameter, an object detection model by training a model using at least the training data; and converting the object detection model into a microservice, wherein the microservice is deployed to the client used by the user.

12. The method of claim 11, wherein the TSO is at least one selected from a group consisting of a credit card, a display of a smart phone, a display of a laptop, a notepad, and a keyboard.

13. The method of claim 11, wherein the target parameter specifies detecting images of SOs in a second environment that hosts a second user's client.

14. The method of claim 10, wherein the sensitive action is a change in a body posture of the user, wherein the user changes the body posture to read a notification from a smart phone.

15. The method of claim 10, wherein the set of hardware peripherals further comprises a microphone, an audio sensor, and an electromagnetic radiation sensor.

16. The method of claim 10, wherein the preference is a security preference that is determined by the user based on a threat detection and mitigation policy.

17. The method of claim 10, wherein the SO is a credit card, wherein at least a part of a third image of the credit card is blurred to hide personal information of the user from a second user in the call.

18. The method of claim 10, wherein the SO is a notepad, wherein at least a part of a third image of the notepad is masked to hide mission critical information from a second user in the call, wherein the third image of the notepad is masked by replacing the mission critical information with fake information.

19. A method for managing security of a user, the method comprising:

establishing a connection with a set of hardware peripherals of a client, wherein the set of hardware peripherals comprises at least a visual sensor;

capturing, via the visual sensor, a snapshot of an environment that hosts the client, wherein the snapshot is a viewable area of the environment that can be imaged by the visual sensor;

making, based on the snapshot, a first determination that an image of a sensitive object (SO) is detected in the environment, wherein the user is notified about the SO;

receiving, in response to notifying the user, a preference about the SO from the user, wherein the reference specifies taking no action with respect to the image;

making, after the receiving, a second determination that the user joined a call;

monitoring, based on the second determination, the environment to capture a real-time video feed, wherein the video feed is analyzed to obtain an analyzed video feed (AVF);

making, based on the AVF, a third determination that a sensitive action is detected;

protecting, based on the third determination, a second SO (SSO) resulting from the sensitive action by blurring or masking a second image of the SSO, wherein the user is notified about the sensitive action and the SSO; and making, in response to notifying the user, a fourth determination that the user does not request removal of the blurring or the masking of the second image.

20. The method of claim 19, further comprising:

prior to establishing the connection:

analyzing a dataset to annotate data, wherein the data is annotated to mark a region of a third SO (TSO) and to obtain annotated data;

cleaning the annotated data to obtain cleaned annotated data, wherein at least training data is generated from the cleaned annotated data;

generating, based on a target parameter, an object detection model by training a model using at least the training data; and converting the object detection model into a microservice, wherein the microservice is deployed to the client used by the user.

* * * * *